(12) United States Patent
Ogawa et al.

(10) Patent No.: US 7,423,961 B2
(45) Date of Patent: Sep. 9, 2008

(54) RADIO APPARATUS AND ADAPTIVE ARRAY PROCESSING METHOD

(75) Inventors: Yasutaka Ogawa, Sapporo (JP); Takeo Ohgane, Sapporo (JP); Yoshiharu Doi, Gifu (JP)

(73) Assignees: Sanyo Electric O., Ltd., Osaka (JP); National University Corporation Hokkaido University, Hokkaido (JP)

( * ) Notice: Subject to any disclaimer, the term of this patent is extended or adjusted under 35 U.S.C. 154(b) by 899 days.

(21) Appl. No.: 10/492,351

(22) PCT Filed: Oct. 11, 2002

(86) PCT No.: PCT/JP02/10637

§ 371 (c)(1),
(2), (4) Date: Apr. 13, 2004

(87) PCT Pub. No.: WO03/034617

PCT Pub. Date: Apr. 24, 2003

(65) Prior Publication Data

US 2004/0246889 A1 Dec. 9, 2004

(30) Foreign Application Priority Data

Oct. 17, 2001 (JP) ............................ 2001-319308

(51) Int. Cl.
*H04J 11/00* (2006.01)
*H04B 1/10* (2006.01)
*H04B 1/00* (2006.01)
*G01S 3/16* (2006.01)

(52) U.S. Cl. ...................... 370/210; 375/346; 455/63.1; 342/378

(58) Field of Classification Search ...................... None
See application file for complete search history.

(56) References Cited

U.S. PATENT DOCUMENTS 6,249,250 B1    6/2001   Namekata et al.

(Continued)

FOREIGN PATENT DOCUMENTS

JP    10-210099    8/1998

(Continued)

OTHER PUBLICATIONS

Chan, Kyu Kim et al.: "Adaptive Beamforming Algorithm for OFDM Systems with Anetnna Arrays," IEEE Transactions on Consumer Electronics, vol. 46, No. 4, Nov. 2000, pp. 1052-1058.

(Continued)

*Primary Examiner*—Steven H. D. Nguyen
(74) *Attorney, Agent, or Firm*—McDermott Will & Emery LLP

(57) ABSTRACT

A correlator detects arriving timings of a desired wave and an interfering wave from a signal transmitted by the OFDM scheme. A reception response vector estimator estimates a first response vector for a signal arriving within a guard interval section from the head arriving wave and a second response vector for a signal arriving after the guard interval section from the head arriving wave out of the desired wave, and also a third response vector for a signal arriving within the guard interval section from the head arriving wave and a fourth response vector for a signal arriving after the guard interval section from the head arriving wave out of the interfering wave. An adaptive array block provides a weight vector based on a result of Fourier transform on the first to fourth response vectors.

12 Claims, 21 Drawing Sheets

U.S. PATENT DOCUMENTS

| | | |
|---|---|---|
| 6,603,427 B2 * 8/2003 | Cai et al. | 342/378 |
| 6,898,235 B1 * 5/2005 | Carlin et al. | 375/219 |
| 6,920,192 B1 * 7/2005 | Laroia et al. | 375/347 |
| 2002/0050948 A1 * 5/2002 | Tanaka et al. | 342/378 |
| 2003/0076908 A1 * 4/2003 | Huang et al. | 375/350 |

FOREIGN PATENT DOCUMENTS

| | | |
|---|---|---|
| JP | 11-205026 | 7/1999 |
| JP | 11-275047 | 10/1999 |
| JP | 11-312991 | 11/1999 |

OTHER PUBLICATIONS

Japanese Office Action, with English Translation, issued in Japanese Patent Application No. JP 2005-134200, mailed on Jan. 22, 2008.

Li, Ye (Geoffrey), "Adaptive Antenna for OFDM Systems With Cochannel Interference," IEEE Transactions on Communications, vol. 47, No. 2, Feb. 1999, pp. 217-229.

* cited by examiner

FREQUENCY

RADIO APPARATUS AND ADAPTIVE ARRAY PROCESSING METHOD

TECHNICAL FIELD

The present invention relates to a configuration of a radio apparatus employed in a base station and an adaptive array processing method in radio communication mainly for a mobile such as a cellular phone.

BACKGROUND ART

In the field of mobile communication systems (for example, personal handyphone system: PHS) evolving rapidly these few years, an adaptive array base station is adapted to practical usage. The adaptive array base station separates and extracts a signal of the desired wave by applying the well known adaptive array processing on the reception signal of an array antenna composed of a plurality of antennas in order to suppress the effect of interfering waves to obtain favorable communication quality.

Furthermore, by employing such an adaptive array base station, a PDMA (Path Division Multiple Access) system can be realized. The PDMA system allows mobile terminal devices of a plurality of users to be subjected to path division multiple access to a radio base system by dividing the same time slot of the same frequency spatially in order to improve the usage efficiency of radio frequency. The PDMA system is also called the SDMA system (Space Division Multiple Access) system.

FIG. 11 represents the channel arrangement of the various communication systems of frequency division multiple access (FDMA), time division multiple access (TDMA), and space division multiple access (SDMA).

First, FDMA, TDMA and SDMA will be described briefly with reference to FIG. 11. FIG. 11(a) corresponds to FDMA. The analog signals of users 1-4 are subjected to frequency-division and transmitted over radio waves of different frequencies f1-f4. The signals of respective users 1-4 are separated by frequency filters.

FIG. 11(b) corresponds to TDMA. Digitized signals of respective users are transmitted over radio waves at different frequencies f1-f4, and time-divided for every prescribed period of time (time slot). The signals of respective users are separated by means of frequency filters and time-synchronization between a base station and each mobile terminal device of respective users.

In the SDMA system shown in FIG. 11(c), the data of a plurality of users are transmitted with one time slot of the same frequency divided spatially. In this SDMA, the signals of respective users are separated by means of frequency filters, time-synchronization between a base station and each mobile terminal device of respective users, and a mutual interference canceller such as an adaptive array.

FIG. 12 is a schematic block diagram showing a configuration of a transmission and reception system 2000 of a conventional base station for SDMA.

In the configuration shown in FIG. 12, n antennas #1-#n (n: natural number) are provided to establish identification between, for example, a user PS1 and a user PS2.

In a reception operation, the outputs of antennas are provided to an RF circuit 2101 to be amplified by reception amplifiers, and then frequency-converted by a local oscillation signal. The converted signals have the unnecessary frequency signal removed by filters, subjected to A/D conversion, and then applied to a digital signal processor 2102 as digital signals.

Digital signal processor 2102 includes a channel allocation reference calculator 2103, a channel allocating apparatus 2104, and an adaptive array 2100. Channel allocation reference calculator 2103 calculates in advance whether the signals from two users can be separated by the adaptive array. Based on the calculation result, channel allocating apparatus 2104 provides channel allocation information including user information, selecting frequency and time, to adaptive array 2100. Adaptive array 2100 applies a weighting operation in real time on the signals from antennas #1-#n based on the channel allocation information to separate only the signal of a particular user.

[Configuration of Adaptive Array Antenna]

FIG. 13 is a block diagram showing a configuration of a transmission and reception unit 2100a corresponding to one user in adaptive array 2100. The example of FIG. 13 has n input ports 2020-1 to 2020-$n$ receiving the signals from antennas #1-#n, respectively, to extract the signal of the desired user from input signals of a plurality of users.

The signals input to input ports 2020-1 to 2020-$n$ are applied via switch circuits 2010-1 to 2010-$n$ to a weight vector calculator 2011 and multipliers 2012-1 to 2012-$n$.

Weight vector calculator 2011 calculates weight vectors $w_{1i}$-$w_{ni}$ using input signals, a unique word signal that is the reference signal prestored in a memory 2014, and the output from an adder 2013. In the present specification, subscript "i" implies that the weight vector is employed for transmission/reception with the i-th user. Therefore, the unique word signal is a training signal for adaptive array processing.

Multipliers 2012-1 to 2012-$n$ multiply the input signals from input ports 2020-1 to 2020-$n$ by weight vectors $w_{1i}$-$w_{ni}$, respectively. The multiplied result is applied to adder 2013. Adder 2013 adds the output signals from multipliers 2012-1 to 2012-$n$ to output the added signals as a reception signal $S_{RX}(t)$. This reception signal $S_{RX}(t)$ is also provided to weight vector calculator 2011.

Transmission and reception unit 2100a further includes multipliers 2015-1 to 2015-$n$ multiplying an output signal $S_{TX}(t)$ of an adaptive array radio base station by respective weight vectors $w_{1i}$-$w_{ni}$ applied from weight vector calculator 2011. The outputs of multipliers 2015-1 to 2015-$n$ are applied to switch circuits 2010-1 to 2010-$n$, respectively. Specifically, switch circuits 2010-1 to 2010-$n$ provides the signals applied from input ports 2020-1 to 2020-$n$ to a signal receiver unit 1R in a signal receiving mode, and provides the signal from a signal transmitter unit 1T to input/output ports 2020-1 to 2020-$n$.

[Operating Mechanism of Adaptive Array]

The operating mechanism of transmission and reception unit 2100a of FIG. 13 will be described briefly here.

For the sake of simplifying the description with reference to the equations, it is assumed that there are four antenna elements, and two users PS effect communication at the same time. In such a case, signals applied to reception unit 1R from respective antennas are represented by the equations set forth below.

$$RX_1(t) = h_{11}Srx_1(t) + h_{12}Srx_2(t) + n_1(t) \quad (1)$$

$$RX_2(t) = h_{21}Srx_1(t) + h_{22}Srx_2(t) + n_2(t) \quad (2)$$

$$RX_3(t) = h_{31}Srx_1(t) + h_{32}Srx_2(t) + n_3(t) \quad (3)$$

$$RX_4(t) = h_{41}Srx_1(t) + h_{42}Srx_2(t) + n_4(t) \quad (4)$$

Signal $RX_j(t)$ represents a reception signal of the j-th (j=1, 2, 3, 4) antenna. Signal $Srx_i(t)$ represents a signal transmitted by the i-th (i=1, 2) user.

Coefficient $h_{ji}$ represents the complex coefficient of a signal from the i-th user received at the j-th antenna, and $n_j(t)$ represents the noise included in the j-th reception signal.

The above equations (1)-(4) may be represented in vector form as follows:

$$X(t)=H_1 Srx_1(t)+H_2 Srx_2(t)+N(t) \quad (5)$$

$$X(t)=[RX_1(t), RX_2(t), \ldots, RX_4(t)]^T \quad (6)$$

$$H_i=[h_{1i}, h_{2i}, \ldots, h_{4i}]^T, (i=1, 2) \quad (7)$$

$$N(t)=[n_1(t), n_2(t), \ldots, n_4(t)]^T \quad (8)$$

In equations (6)-(8), $[\ldots]^T$ denotes the transposition of $[\ldots]$.

Here, X (t) represents the input signal vector, $H_i$ the reception response vector of the i-th user, and N (t) a noise vector.

The adaptive array antenna outputs as a reception signal $S_{RX}(t)$ a synthesized signal obtained by multiplying the input signals from respective antennas by respective weight coefficients $w_{1i}$-$w_{4i}$, as shown in FIG. 13.

Given these preliminaries, the operation of an adaptive array in the case of extracting a signal $Srx_1(t)$ transmitted by the first user, for example, is set forth below.

Output signal y1 (t) of adaptive array 2100 can be represented by the following equations by multiplying input signal vector X(t) by weight vector $W_1$.

$$y1(t)=X(t)W_1^T \quad (9)$$

$$W_1=[w_{11}, w_{21}, w_{31}, w_{41}]^T \quad (10)$$

In other words, weight vector $W_1$ is a vector with the weight coefficients $w_{j1}$ (j=1, 2, 3, 4) to be multiplied by the j-th input signals RXj (t) as elements.

Substituting input signal vector X (t) represented by equation (5) into y1 (t) represented by equation (9) yields:

$$y1(t)=H_1 W_1^T Srx_1(t)+H_2 W_1^T Srx_2(t)+N(t)W_1^T \quad (11)$$

By a well known method, weight vector $w_1$ is sequentially controlled by weight vector calculator 2011 so as to satisfy the following simultaneous equations when adaptive array 2100 operates in an ideal situation.

$$H_1 W_1^T=1 \quad (12)$$

$$H_2 W_1^T=0 \quad (13)$$

If weight vector $W_1$ is perfectly controlled so as to satisfy equations (12) and (13), output signal y1 (t) from adaptive array 2100 is eventually represented by the following equations.

$$y1(t)=Srx_1(t)+N_1(t) \quad (14)$$

$$N_1(t)=n_1(t)w_{11}+n_2(t)w_{21}+n_3(t)w_{31}+n_4(t)w_{41} \quad (15)$$

Specifically, signal $Srx_1$ (t) emitted from the first of the two users will be obtained for output signal y1 (t).

In FIG. 13, input signal $S_{TX}$ (t) for adaptive array 2100 is applied to transmitter unit 1T in adaptive array 2100 to be applied to respective one inputs of multipliers 2015-1, 2015-2, 2015-3, ..., 2015-n. To the other inputs of these multipliers, weight vectors $w_{1i}, w_{2i}, w_{3i}, \ldots, w_{ni}$ calculated by weight vector calculator 2011 based on reception signals described above are copied and applied.

The input signals weighted by these multipliers are delivered to corresponding antennas #1, #2, #3, ..., #n via corresponding switches 2010-1, 2010-2, 2010-3, ..., 2010-n for transmission.

Identification of users PS1 and PS2 is made as set forth below. A radio wave signal of a cellular phone is transmitted in frame form. The radio wave signal of a cellular phone is mainly composed of a preamble formed of a signal series known to a radio base station, and data (voice and the like) formed of a signal series unknown to the radio base station.

The preamble signal series includes a signal stream of information (unique word signal) to identify whether the current user is the appropriate user to converse for the radio base station. Weight vector calculator 2011 of adaptive array radio base station 1 compares the unique word signal output from memory 2014 with the received signal series to conduct weight vector control (determine a weight coefficient) so as to extract the signal expected to include the signal series corresponding to user PS1.

The above description is based on a configuration in which the weight vector of the reception mode is copied to form the directivity of a transmission signal in a signal transmission mode. Alternatively, the weight vector of the reception mode can be corrected to be used as the weight vector for transmission taking into account the travel speed or the like of the terminal device in a transmission mode.

As a communication system of high usage efficiency of frequency, the orthogonal frequency division multiplexing (OFDM) scheme is known.

The OFDM scheme is one type of multicarrier modulation of spreading data of one channel into a plurality of carrier waves for modulation. In the OFDM scheme, the frequency spectrum of the signal employed in communication is substantially rectangular.

FIG. 14 shows the extraction of three carriers (carrier waves) of the frequency spectrum of a plurality of carriers employed in the OFDM scheme.

Attention is focused on the spectrum of one carrier wave shown in FIG. 14. In the OFDM scheme, the frequency interval of a plurality of carrier waves is set so that the zero point of the spectrum of this one carrier wave matches the frequency of an adjacent carrier wave. In other words, each carrier wave is arranged at a frequency avoiding mutual interference, and each carrier wave is orthogonal to each other.

The interval $\Delta f$ of the frequency of each carrier wave is expressed by the following equation, where Ts is the duration of one symbol of transmitted data.

$$\Delta f=1/Ts \times n \text{ (n: natural number)}$$

FIG. 15 represents the waveform of the symbol transmitted in accordance with the OFDM scheme.

As a result of combining the waveforms of i=1 to i=N carrier waves, i.e., a total of N carrier waves, a signal represented by the bottom most waveform in FIG. 15 is employed as the transmission symbol of OFDM.

In order to obtain each carrier component in the modulation of the OFDM scheme, inverse discrete Fourier transform is carried out on the baseband signal. Correspondingly, in the demodulation process of a reception wave, discrete Fourier transform is applied on the reception signal through the algorithm of the so-called Fast Fourier Transform (FFT).

In the OFDM signal waveform in FIG. 15, a "guard interval" is provided before the valid symbol period. Such a guard interval has a portion of the valid symbol waveform, for example a signal of a predetermined time Tg at the tail of the valid symbol waveform, copied and added.

The guard interval is provided as countermeasures against an interfering wave caused by multipath interference.

In the case where a desired wave and an interfering wave arriving behind time are combined to form a reception signal, the effect of the interfering wave is limited within the guard interval period if the delay time of the interfering wave is within the time set as the guard interval. By setting the guard interval period longer than the expected delay time of an interfering wave, demodulation can be performed with the effect of an interfering wave removed.

FIG. 16 is a schematic diagram to describe a demodulation operation when such a desired wave and interfering wave are received.

In demodulation according to the OFDM scheme, a time window termed "FFT window" is provided in each symbol period, as shown in FIG. 16. This time window denotes the section corresponding to the process of cutting out only the valid symbol section from the received OFDM transmission symbol. The FFT window is set equal to the valid symbol period length Ts. The guard interval period is set longer than the delay time of an interfering wave, as mentioned above. Accordingly, the orthogonality of each carrier wave of a reception wave can be maintained even if there is an interfering wave since a signal present in the guard interval period is a signal in the same valid symbol. Thus, demodulation with the effect of such an interfering wave removed can be carried out at the receiving side.

It is expected that a higher communication quality and a reception scheme of higher usage efficiency of radio frequency can be realized by the combination of the above-described adaptive array scheme and OFDM scheme.

However, the mere combination of the two schemes will pose problems set forth below.

[Problem in Configuration of Operating Adaptive Array Differing for Every Carrier]

An example of a first configuration for OFDM transmission using an adaptive array will be described hereinafter.

By such a configuration, the above-described multiple access of the SDMA scheme can be established by application of adaptive array technique.

FIG. 17 is a schematic block diagram to describe a configuration of such an adaptive array base station 3000.

Referring to FIG. 17, it is assumed that adaptive array base station 3000 conducts transmission and reception using an adaptive array antenna including four antennas #1-#4, for the sake of simplification. In FIG. 17, description is based on a configuration directed to reception in accordance with the configuration of an adaptive array base station.

Referring to FIG. 17, adaptive array base station 3000 includes an A/D converter 3010 receiving signals from adaptive array antennas #1-#4 to carry out detection and analog-digital conversion, and an FFT unit 3020 applying fast Fourier transform on a received digital signal from A/D converter 3010 to separate the signal for each carrier wave.

In the present description, the signal from the i-th antenna for the first carrier among the signals output from FFT unit 3020 is represented as signal f1, i (1, i: natural number).

Adaptive array base station 3000 further includes N (N: total number of carriers) adaptive array blocks 3030.1-3030.N provided for each carrier. Each adaptive array block receives the component of a corresponding carrier obtained by applying Fourier transform on the signal from antennas #1-#4 through FFT unit 3020 to carry out adaptive array processing.

It is to be noted that only adaptive array block 3030.1 for the first carrier is depicted in FIG. 17.

Adaptive array block 3030.1 includes, likewise the adaptive array base station shown in FIG. 13, a reception weight vector calculator 3041 receiving signals f1, 1-f1, 4 to calculate a reception weight vector, multipliers 3042-1 to 3042-4 receiving signals f1, 1 to f1, 4 at respective one inputs and the reception weight vector from reception weight vector calculator 3041 at respective other inputs, an adder 3043 to receive and combine the outputs of multipliers 3042-1 to 3042-4, and a memory 3044 to prestore a unique word signal (reference signal) used in the calculation of adaptive array processing by reception weight vector calculator 3041. Adder 3043 outputs a desired signal S1 (t) for carrier 1. This desired signal S1 (t) is also applied to reception weight vector calculator 3041.

By such a configuration, the signal from a desired user can be separated for each carrier from a signal transmitted by the OFDM transmission scheme by adaptive array processing for reception.

In the configuration of such an adaptive array base station 3000, the following problems are noted.

As described above, the signal of one channel is spread into a plurality of carriers for transmission in the OFDM scheme.

Therefore, the number of symbols of a reference signal included for each carrier is often not sufficient for the signals transmitted through the OFDM scheme. For example, in "multimedia mobile access communication systems (MMAC)" recommended by the Ministry of Public Management or the like, two symbols are defined for the reference signal for each OFDM carrier (subcarrier).

In this case, it will be difficult to converge the weight based on the configuration of adaptive array base station 3000 shown in FIG. 17. There was a problem that directivity of favorable accuracy could not be established.

Furthermore, the configuration of adaptive array base station 3000 shown in FIG. 17 has problem set forth below.

FIG. 18 is a schematic diagram representing the timing of a signal received at adaptive array base station 3000 of FIG. 17.

In FIG. 18, the section labeled "G" represents the above-described guard interval period of a reception signal.

The primary desired wave is generally the first signal arriving at the base station. The first arriving signal is referred to as "head arriving signal" hereinafter.

With respect to this head arriving signal, a signal arriving in delay within the guard interval period is called a "short delayed signal" whereas a signal arriving in delay for at least the guard interval period from the head arriving signal is referred to as a "long delayed signal", under the influence of multipath. The route through which each of a head arriving signal, a short delayed signal, and a long delayed signal is transmitted is referred to as a "path".

In FIG. 18, the signal sampling timing in adaptive array block 3030.1 is denoted with an arrow.

Since adaptive array processing is carried out on a signal that has been divided for each carrier in adaptive array base station 3000, the sampling timing of a signal is to be set at a time interval sufficient for extracting a signal waveform for each carrier.

By adaptive array processing, a long delayed signal as shown in FIG. 18 can be removed.

The bandwidth of a band-divided carrier is so narrow that a short delayed signal cannot be separated. Therefore, processing is carried out with the head arriving signal and the short delayed signal regarded as the same signal in adaptive array processing.

FIG. 19 shows the intensity distribution of signals corresponding to respective carriers after passing through such an adaptive array.

In each of frequencies f1-fN of carriers in FIG. 19, the spectrum of the head arriving signal (head wave) and the spectrum of a short delayed signal (short delayed wave) appear to be the same signal after the adaptive array processing, as mentioned above. However, since the band for the entire carriers is extremely wide, there may be the case where the head wave and the short delayed wave are opposite in phase in the carrier indicated by the arrow in FIG. 19.

FIG. 20 represents the intensity distribution when the signals for respective carriers are combined in the case of FIG. 19.

If adaptive array reception is conducted using a reference signal timed to the head wave, only a signal of small level can be extracted for the carrier of a frequency having the head signal and the short delayed signal in opposite phase. In other words, if adaptive array reception is conducted for each carrier, only a signal of an extremely low signal level can be extracted for a carrier of a frequency that has the head wave and the short delayed wave in opposite phase, as shown in FIG. 19.

Since sufficient signal transmission cannot be conducted for the carrier indicated by the arrow in FIG. 19, a redundancy code must be used or control must be provided to communicate without using this carrier. The latter is equivalent to remove as an unnecessary signal a signal originally arriving at the base station as a short delayed signal. This will lead to degradation in reception sensitivity Summarizing, there is a problem that is difficult to ensure a sufficient reference signal required for directional control of high accuracy in the configuration of operating an adaptive array differing for each carrier as shown in FIG. 17.

There is also a problem that the reception sensitivity is degraded since multipath signals within the guard interval cannot be combined in maximum ratio.

In other words, since a signal of a delay time within the guard interval (short delay component) has high correlation with the head signal, a short delay component will be included in the array combined output if combining based on the adaptive array is carried out using a reference signal timed to the head signal. However, in the case where a plurality of carriers employed in communication are distributed over an extremely wide band in the OFDN scheme, there may be a case where the head wave and the short delayed wave are opposite in phase depending upon the carrier. In such a case, there will be a problem that combination at the maximum ratio is not conducted when viewed over the entire carrier.

[Problems Based on a Configuration of Adaptive Array Operation with Weight to Entire Carrier]

In view of the above-described problems in the configuration of adaptive array base station 3000, an approach of another configuration may be considered, conducting adaptive array processing on a signal prior to band-division by an FFT process.

FIG. 21 is a schematic block diagram to describe a configuration of an adaptive array base station 4000 operating an adaptive array, calculating a common weight for all the carriers.

Referring to FIG. 21, adaptive array base station 4000 includes, likewise adaptive array base station 3000 of FIG. 17, an A/D converter 4010 applying detection and analog-digital conversion on signals received from four antennas #1-#4, a reception weight vector calculator 4041 receiving outputs of A/D converter 4010 to calculate reception weight vectors for signals of respective antennas, multipliers 4042-1 to 4042-4 receiving signals from array antennas at respective one inputs, and receiving weight vectors from reception weight vector calculator 4041 at respective other inputs, an adder 4043 to receive and combine outputs from multipliers 4024-1 to 4042-4, a memory 4044 to prestore a reference signal employed in calculating weight vectors by reception weight vector calculator 4041, and an FFT unit 4050 applying fast Fourier transform processing on a received output from adder 4043 for separating into signals $S_{1(t)}$-$S_{N(t)}$ of the desired waves for respective carriers. The output from adder 4043 is applied to reception weight vector calculator 4041 to be used in the calculation of a reception weight vector.

FIG. 22 is a schematic diagram to describe an operation of adaptive array base station 4000 of FIG. 21.

In FIG. 22, "G" denotes a guard interval period. For the purpose of applying adaptive array processing on a signal not yet subjected to band-division, the sampling timing of, for example, reception weight vector calculator 4041 in the adaptive array must be set shorter than that for a signal subjected to band division as shown in FIG. 18.

A long delayed signal can similarly be removed by adaptive array processing through an adaptive array block.

The signal applied to an adaptive array block has an extremely wide band since it is not band-divided. In other words, a head arriving signal and a short delayed signal will be recognized as completely different signals at reception weight vector calculator 4041. Therefore, such short delayed signals will be removed by adaptive array processing.

This operation is disadvantages in that, although the short delayed signal per se is a desired wave whose property may be improved if used effectively, such a short delayed signal will be removed by the adaptive array processing, resulting in the problem of degradation in communication quality.

Furthermore, since a short delayed signal will be regarded as an interfering signal, it will look as if a large number of interfering waves are arriving when viewed on part of adaptive array base station 4000. If directivity is established by the adaptive array in order to remove such signals, there is a possibility of no degree of freedom of the antenna left.

If there is no degree of freedom of antenna left, the gain towards the direction of a desired wave will be degraded, or the interference may not be completely removed since it will look as if there are interference exceeding the antenna degree of freedom.

The present invention is directed to overcome the above-described problems. An object of the present invention is to provide an adaptive array base station that can combine at the maximum ratio the multipath signals within a guard interval to improve reception sensitivity even in the case of adaptive array reception with respect to the OFDM transmission scheme.

Another object of the present invention is to provide an adaptive array base station that can maintain the interference suppression performance without consuming the antenna degree of freedom in combining multipath signals within a guard interval period.

DISCLOSURE OF THE INVENTION

In summary, a radio apparatus of the present invention for transmitting and receiving a signal transmitted with a guard interval section added to each valid symbol section by an orthogonal frequency division communication scheme employing a plurality of carries includes: an array antenna having a plurality of antennas; arriving timing detection means for detecting an arriving timing of a desired wave from signals received by the array antenna; reception response vector estimation means for estimating a first response vector for a signal arriving within the guard interval section from a head arriving wave of the desired wave, and a second response vector for a signal arriving after the guard interval section from the heard arriving wave of the desired wave; first Fourier transform means for applying Fourier transform on the first and second response vectors to extract components for respective ones of the plurality of carriers; second Fourier transform means for applying Fourier transform on reception signals from an array antenna to extract components for respective carriers of reception signals for respective ones of the antennas; and adaptive array processing means provided for every respective ones of the plurality of carriers, each adaptive array processing means receiving a component of a corresponding carrier from the second Fourier transform means among components for carriers of reception signals for respective ones of the antennas for extracting the component of the corresponding carrier in the desired wave. The adaptive array processing means provides a weight vector used to extract the component of the corresponding carrier based on components for corresponding carriers of at least first and second response vectors from the first Fourier transform means.

Preferably, the arriving timing detection means detects the desired wave in accordance with a cross correlation between the reception signal prior to Fourier transform in the second Fourier transform means and a reference signal including a training signal component corresponding to the plurality of carriers exceeding a predetermined threshold value, for each antenna.

Preferably, the reception response vector estimation means sets the response level to 0 in the first and second response vectors at a time other than the arriving timing detected by the arriving timing detection means.

Preferably, the adaptive array processing means provides a weight vector used to extract the desired wave for the corresponding carrier by a correlation matrix for each carrier, provided based on components for corresponding carriers of the first and second response vectors.

Preferably, the arriving timing detection means detects an arriving timing of n (n: natural number, $n \geq 1$) interfering waves from a signal received from an array antenna; the reception response vector estimation means estimates third to (2n+1)th response vectors for signals arriving within the guard interval section from each head arriving wave for each of the n interfering waves, and fourth to (2n+2)th response vectors for respective signals arriving after the guard interval section from each head arriving wave for each of said n interfering waves; the first Fourier transform means further applies Fourier transform on the third to (2n+2)th response vectors to extract a component for each of the plurality of carriers; and the adaptive array processing means provides a weight vector used to extract the component of the corresponding carrier based on components for corresponding carriers of the first to (2n+2)th response vectors from the first Fourier transform means.

Further preferably, the arriving timing detection means detects the desired wave and the interfering wave in accordance with a cross correlation between the reception signal prior to Fourier transform in the second Fourier transform means and a reference signal including a training signal component corresponding to the plurality of carriers exceeding a predetermined threshold value, for each antenna.

Preferably, the reception response vector estimation means sets a response level to 0 in the first to (2n+2)th response vectors at a time other than the arriving timing detected by the arriving timing detection means.

Preferably, the adaptive array processing means provides a weight vector used to extract the desired wave for the corresponding carrier by a correlation matrix for each carrier, provided based on components for corresponding carriers of the first to (2n+2)th response vectors.

Preferably the adaptive array processing means provides a weight vector used to extract the interfering wave for the corresponding carrier by a correlation matrix for each carrier.

Preferably, the reception response vector estimation means estimates the first to (2n+2)th response vectors by the MMSE scheme.

According to another aspect of the present invention, an adaptive array processing method to extract a signal transmitted with a guard interval section added to each valid symbol section by an orthogonal frequency division communication scheme employing a plurality of carriers for every component corresponding to the plurality of carriers by adaptive array processing includes the steps of: detecting an arriving timing of at least a desired wave from signals received by an array antenna having a plurality of antennas; estimating a first response vector for a signal arriving within the guard interval section from a head arriving wave out of the desired wave, and a second response vector for a signal arriving after the guard interface section from the head arriving wave of the desired wave; applying Fourier transform on the first and second response vectors to extract components for respective ones of the plurality of carriers; providing a weight vector used to separate by adaptive array processing a component corresponding to the carrier for a desired wave, based on components for carriers of at least first and second response vectors; applying Fourier transform on reception signals from the array antennas to extract carrier components of reception signals for respective antennas; and multiplying the weight vector by the carrier component of a reception signal for each antenna to extract the component of the corresponding carrier for the desired wave.

Preferably, the step of detecting an arriving timing further includes the step of detecting the arriving timing of at least one interfering wave. The method further includes the steps of estimating a third response vector for a signal arriving within the guard interval section from the head arriving wave out of an interfering wave, and a fourth response vector for a signal arriving after the guard interval section from the head arriving wave out of the interfering wave; and applying Fourier transform on the third and fourth response vectors to extract components for respective ones of the plurality of carriers. The step of providing a weight vector provides the weight vector based on components for carriers of the first to fourth response vectors.

BEST MODE FOR CARRYING OUT THE INVENTION

First Embodiment

Figure 1:
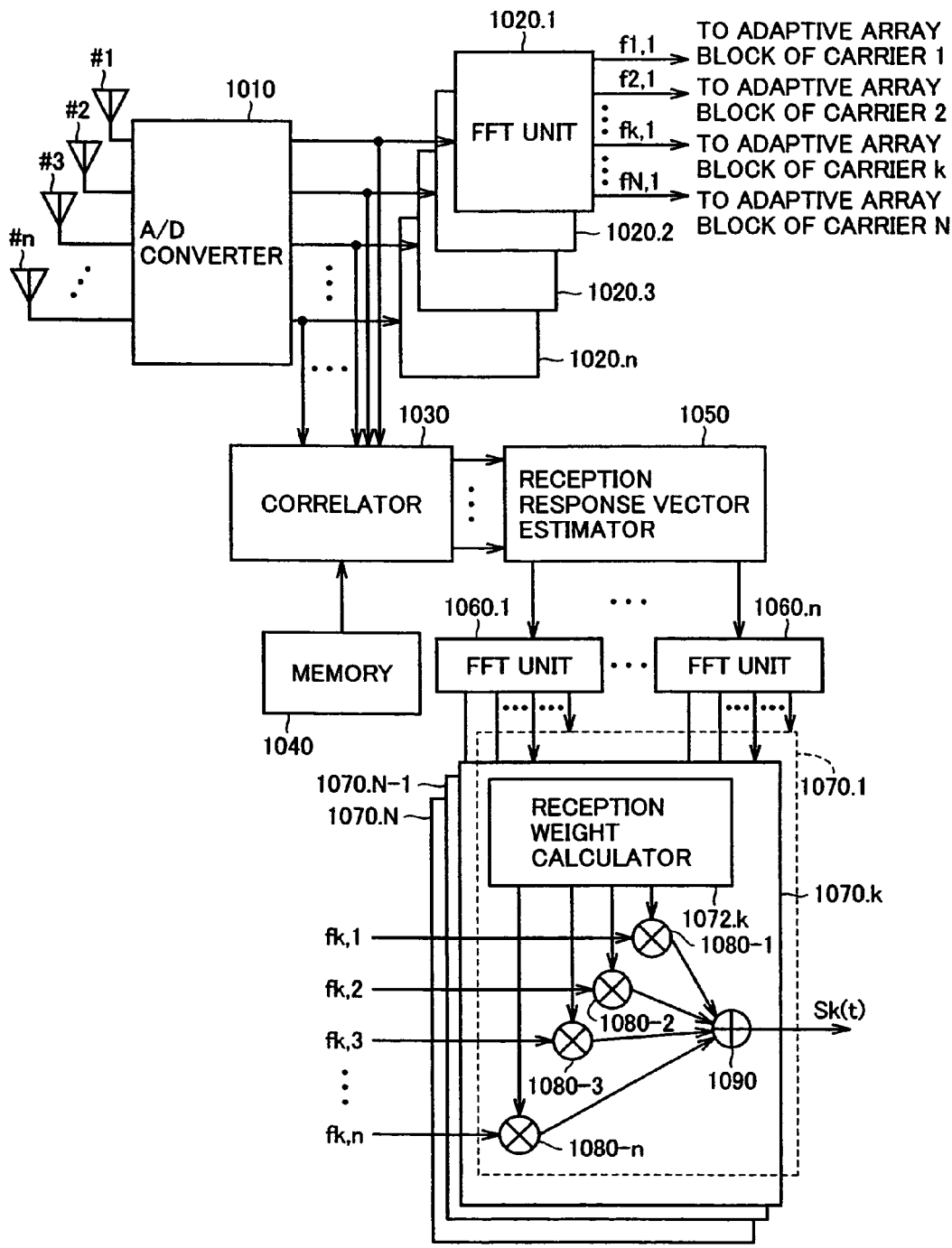
FIG. 1 is a schematic block diagram showing a structure of adaptive array base station 1000 according to an embodiment of the present invention.

FIG. 1 is a schematic block diagram to describe a configuration of adaptive array base station 1000 according to an embodiment of the present invention. Adaptive array base station 1000 of the present invention transmits and receives a signal having directivity by adaptive array processing with respect to a mobile station such as a user's terminal. It is to be noted that adaptive array base station 1000 can also transmit and receive a signal with respect to a mobile station through the spatial division multiple scheme as will be described afterwards.

Referring to FIG. 1, adaptive array base station 1000 includes an array antenna formed of n (n: natural number) antennas, an A/D converter 1010 to conduct detection and analog-digital conversion on signals received from array antennas #1-#n, FFT units 1020.1-1020.n provided for respective n antennas, receiving outputs from A/D converter 1010 to separate and extract signals for respective carriers for corresponding antennas, a correlator 1030 receiving signals from A/D converter 1010 to detect arriving timings of a desired wave and an interfering wave, as will be described afterwards, a memory 1040 to store reference signals corresponding to the desired wave and the interfering wave in order to detect the arriving timings of the desired wave and the interfering wave at correlator 1030, a reception response vector estimator 1050 receiving signals prior to fast Fourier transform, applied to correlator 1030 from A/D converter 1010, and information on the arriving timing of a signal detected at correlator 1030 for estimating a response vector in a procedure that will be described afterwards for the desired wave and the interfering wave, FFT units 1060.1-1060.n provided corresponding to respective antennas, receiving a reception response of each antenna estimated by reception response vector estimator 1050 and applying fast Fourier transform to extract a response vector for each carrier, and adaptive array blocks 1070.1-1070.N (N is the total number of carriers) provided for respective carriers, receiving response vectors of corresponding carriers for antennas #1-#n from FFT units 1060.1-1060.n to apply adaptive array processing.

In FIG. 1, only adaptive array block 1070.k corresponding to the k-th carrier is depicted.

Adaptive array block 1070.k includes a reception weight calculator 1072.k calculating a weight vector, multipliers 1080-1 to 1080-n receiving signals for the k-th carrier from FFT unit 1020.1-1020.n at respective one input nodes and the weight vector from reception weight calculator 1072.k at respective other input nodes, and an adder 1090 receiving and adding the signals from multipliers 1080-1 to 1080-n to output a desired signal Sk (t) for the k-th carrier.

Figure 2:
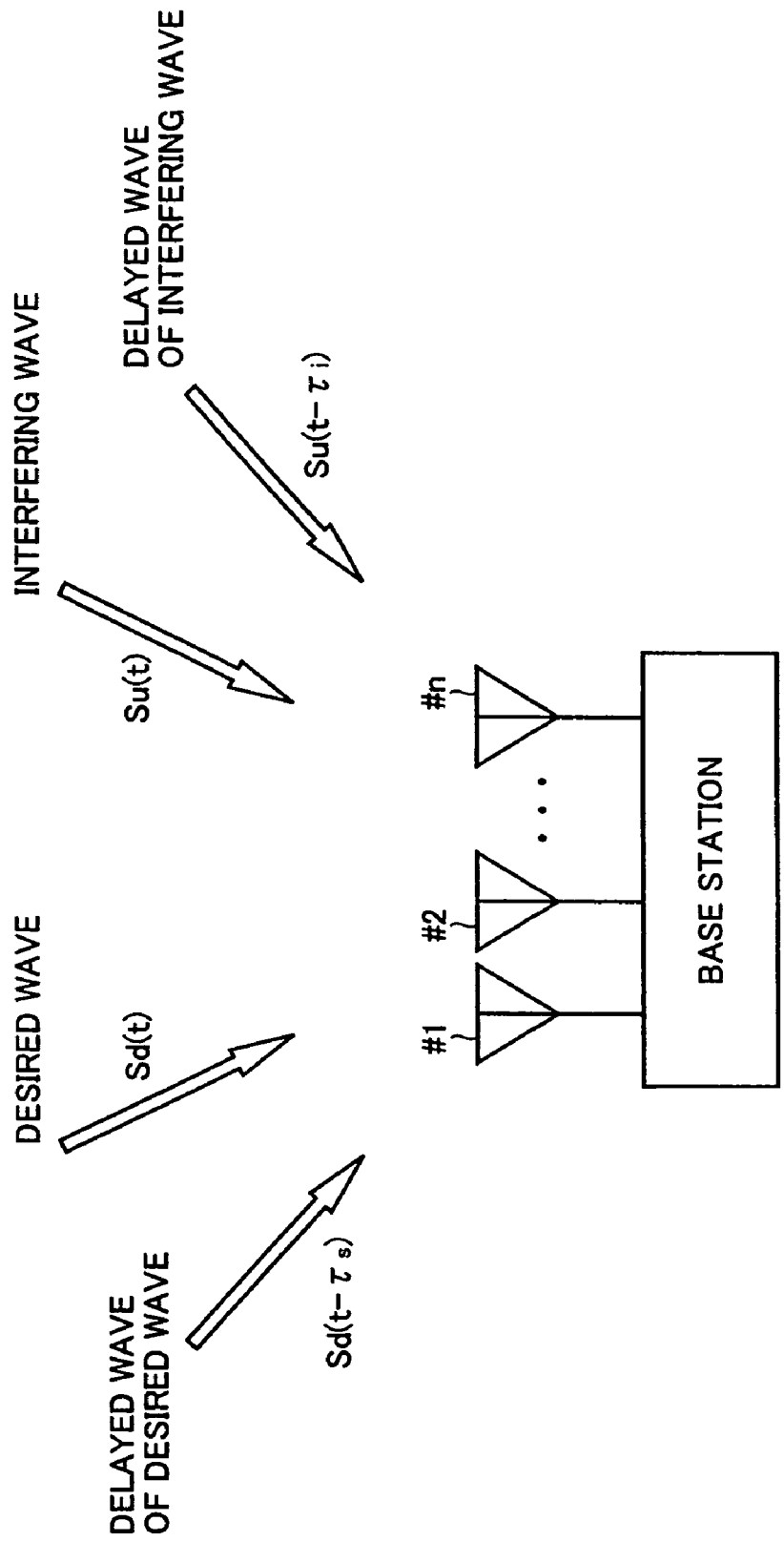
FIG. 2 is a schematic diagram to describe a reception signal of adaptive array base station 1000 shown in FIG. 1.

FIG. 2 is a schematic diagram to describe a reception signal of adaptive array base station 1000 shown in FIG. 1.

In adaptive array base station 1000, the reception wave includes a desired wave $S_d(t)$, a delayed wave $S_d(t-\tau_s)$ of the desired wave, an interfering wave $S_u(t)$, and a delayed wave $S_u(t-\tau_i)$ of the interfering wave. In the present description, time $\tau_s$ and time $\tau_i$ are the delayed time. The subscript "d" of a signal implies the signal of a desired wave. The signal of an interfering wave is represented by the subscript "u".

Figure 3:
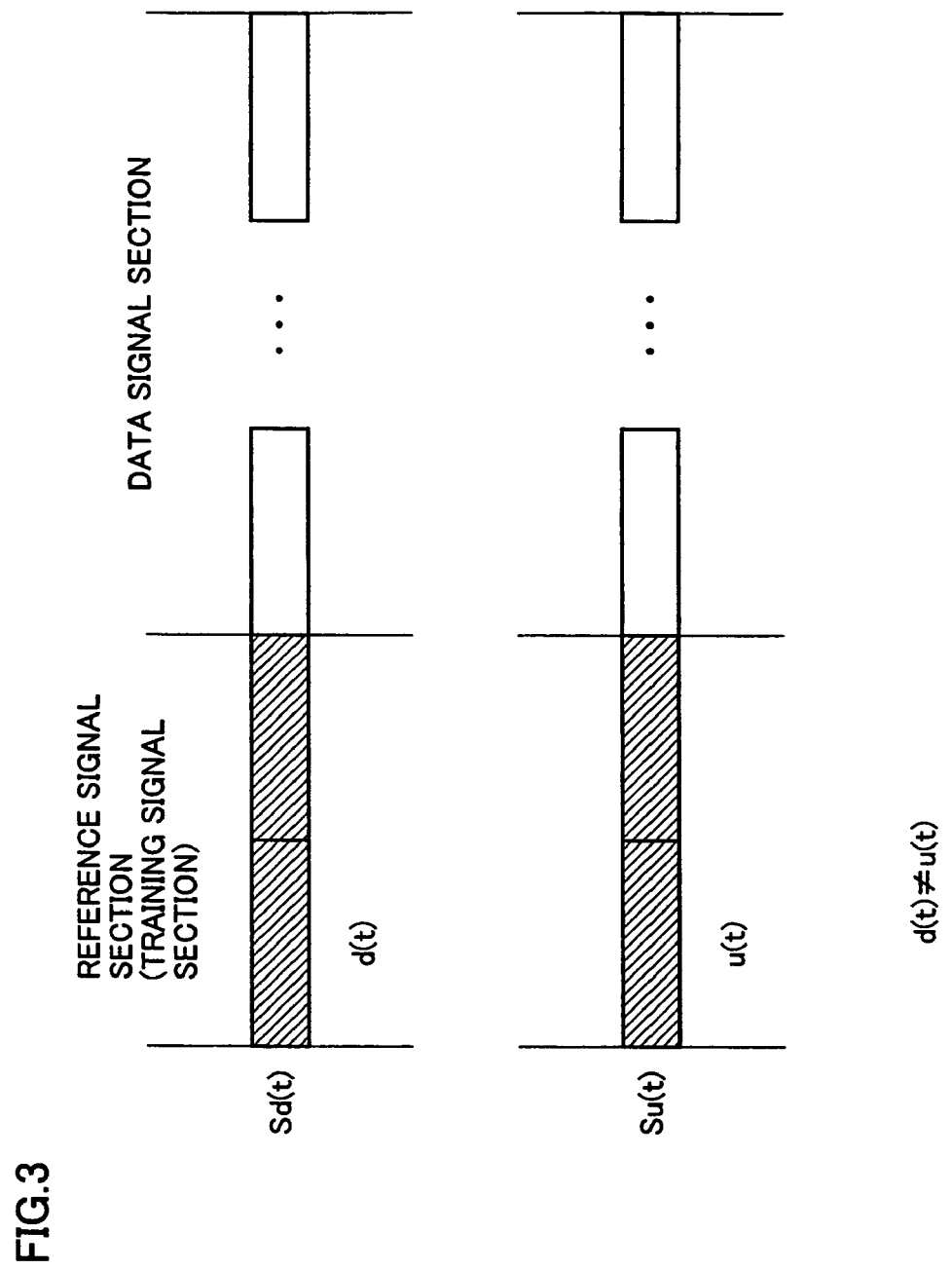
FIG. 3 is a schematic diagram to describe a configuration of a desired wave $S_d(t)$ and interfering wave $S_u(t)$.

FIG. 3 is a schematic diagram to describe a configuration of desired wave $S_d(t)$ and an interfering wave $S_u(t)$.

Desired wave $S_d(t)$ includes, but not exclusively, a reference signal section of two symbols (training signal section) at the beginning, and a data signal section continuous thereto, for example.

In the present description, reference signal d (t) is an inverse Fourier transform version of the training symbol of an input signal aligned in the frequency domain, and is a signal of a time domain.

Similarly, interfering wave $S_u(t)$ includes a reference signal section u (t) of two symbols at the beginning, and a data signal section continuous thereto, for example.

It is assumed that reference signal section d (t) of a desired wave is a signal differing from the reference signal section u (t) of an interfering wave without losing universality.

Therefore, adaptive array base station 1000 can identify the mobile station such as a user's terminal by such a different reference signals (training signals).

[Operation of Correlator]

Figure 4:
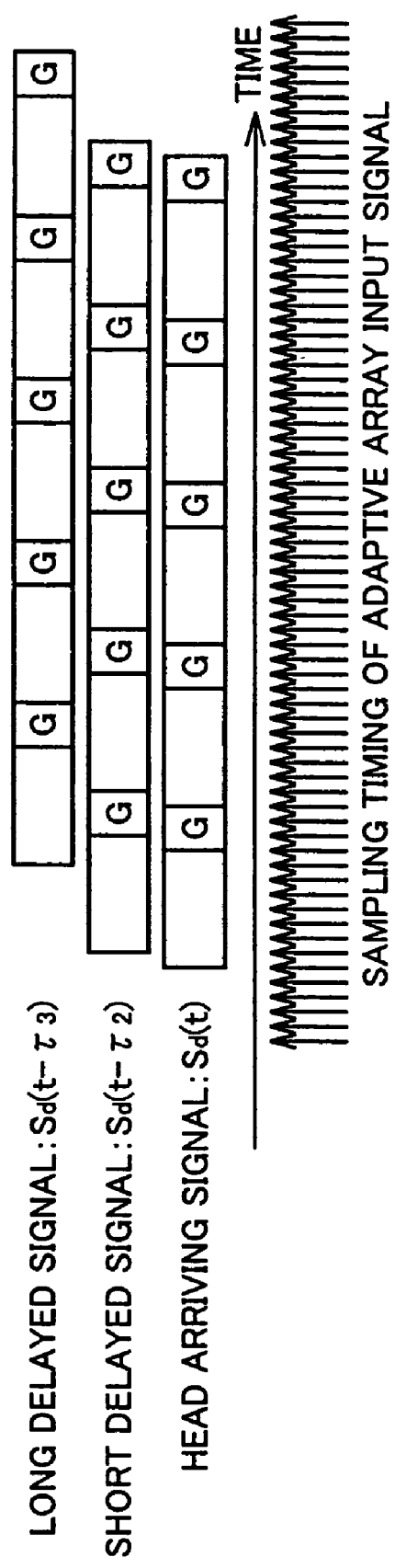
FIG. 4 is a schematic diagram to describe an operation of a correlator 1030 in adaptive array base station 1000 of FIG. 1.

FIG. 4 is a schematic diagram to describe an operation of correlator 1030 of adaptive array base station 1000 shown in FIG. 1.

The signals applied to correlator 1030 include a head arriving signal $S_d(t)$, a short delayed signal $S_d(t-\tau_2)$ arriving at a delay time $\tau_2$ shorter than the guard interval period, and a long delayed signal $S_d(t-\tau_3)$ arriving at a delay time $\tau_3$ corresponding to at least the guard interval period for a desired wave, as well as a head arriving signal $S_u(t)$, a short delayed signal $S_u(t-\tau_2)$ arriving at a delay time $\tau_2$ shorter than the guard interval period, and a long delayed signal $S_u(t-\tau_3)$ arriving at a delay time $\tau_3$ corresponding to at least the guard interval period for an interfering wave.

In adaptive array base station 1000, it is necessary to process a signal prior to FFT processing for the operation of correlator 1030. Therefore, correlator 1030 samples a reception signal at a sufficiently short sampling timing to carry out signal processing prior to FFT processing.

Signal $X_n$ (t) applied from antenna #n to correlator 1030 can be represented by the following equation (16).

$$x_n(t)=h_{n,1}s_d(t)+h_{n,2}s_d(t-\tau_2)+h_{n,3}s_d(t-\tau_3)+\ldots+p_{n,1}s_u(t)+p_{n,2}s_u(t-\tau_2)+p_{n,3}s_u(t-\tau_3)+\ldots+n_n(t) \quad (16)$$

In equation (16), $h_{n,1}$ designates the response of the head wave (element of a response vector) of a desired wave received at the n-th antenna #n, and $\rho_{n,1}$ designates the response of the head wave of an interfering wave (multiple party in SDMA) received at the n-th antenna #n.

Similarly, coefficients $h_{n,2}$ and $h_{n,3}$ designate the response of delayed waves of a desired wave (element of response vector) received at the n-th antenna #n. Coefficients $\rho_{n,2}$ and $\rho_{n,3}$ designate the response of delayed waves of an interfering wave (multiple party in SDMA) received at the n-th antenna #n.

As mentioned before, signal $S_d$ (t) is a signal of a desired wave, whereas signal $s_u$ (t) is a signal of an interfering wave (multiple party in SDMA).

It is to be noted that the terms of the interfering wave will increase in equation (16) when there are more interference or multiple users.

Calculation of a correlation function $\rho_{n,d}$ (t) between a reception signal $X_n$ (t) of antenna #n and reference signal $s_d$(t) (t is a reference signal section) of a desired wave, and a correlation function $\rho_{n,u}$ (t) between a reception signal $X_n$ (t) of antenna #n and a reference signal $s_u$ (t) (t is a reference signal section) of an interfering wave yields the following equations.

$$\rho_{n,d}(t)=h_{n,1}\delta(t)+h_{n,2}\delta(t-\tau_2)+h_{n,3}\delta(t-\tau_3)+I_d(t) \quad (17)$$

$$\rho_{n,u}(t)=p_{n,1}\delta(t)+p_{n,2}\delta(t-\tau_2)+p_{n,3}\delta(t-\tau_3)+I_u(t) \quad (18)$$

There remains in correlation function $\rho_{n,d}$ (t) between the reference signal of a desired wave and the reception signal of antenna #n the correlation component between the desired wave and the reference signal, as well as a small correlation component $I_d$ (t) between the interfering wave and noise.

Similarly, there remains in correlation function $\rho_{n,u}$ (t) between the reception signal of antenna #n and the reference signal of the interfering wave the correlation component between the interfering wave and the reference signal as well as a small correlation component $I_u$ (t) between the interfering wave and noise.

Such a correlation function $\rho_{n,d}$ (t) or correlation function $\rho_{n,u}$ (t) is also termed "sliding correlation".

Figure 5:
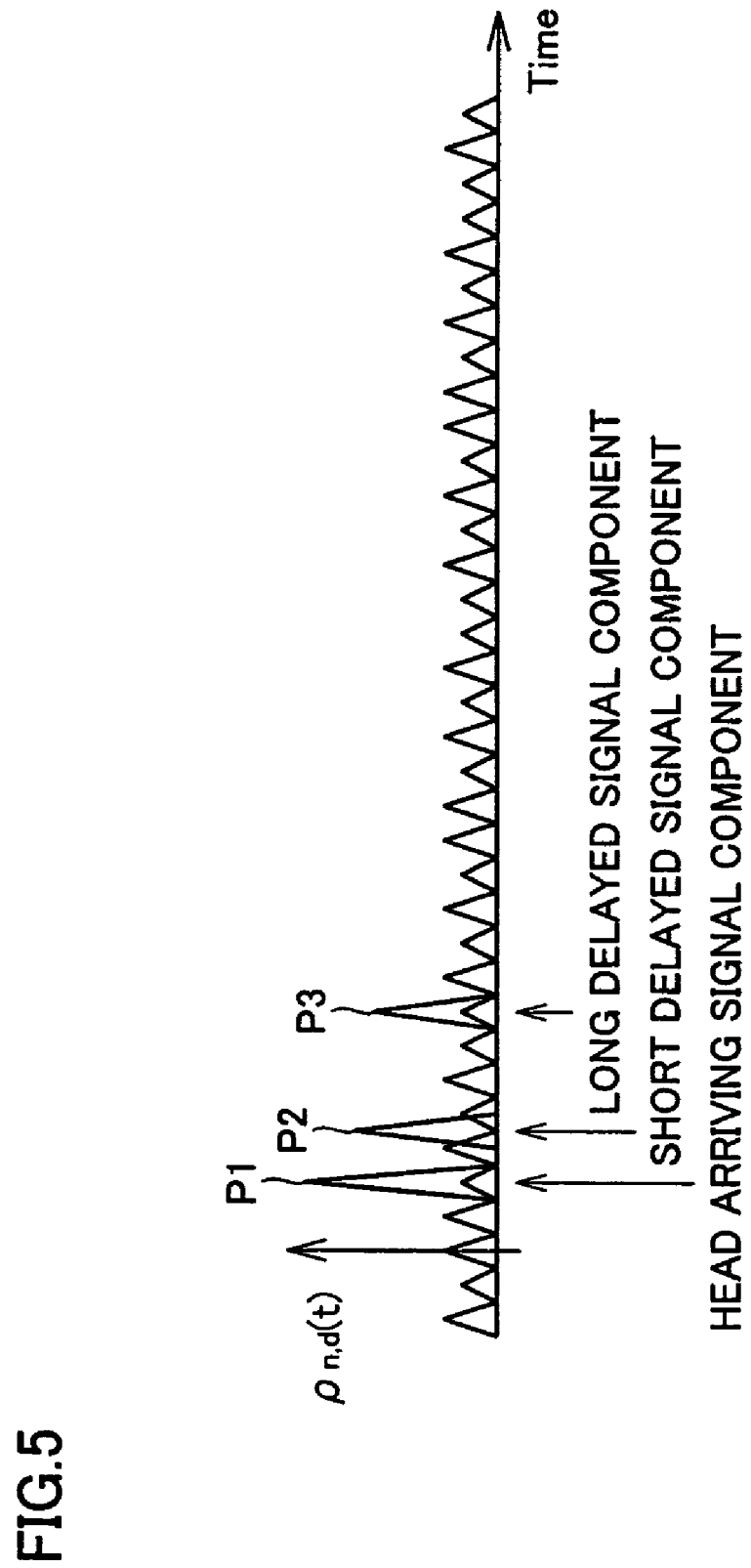
FIG. 5 represents the time dependency of a correlation function $\rho_{n,d}(t)$.

FIG. 5 represents the time dependence of such a correlation function $\rho_{n,d}$ (t).

In practice, correlation function $\rho_{n,d}$(t) is a signal, which is actually a complex number whose absolute value and phase on the complex plane change over time. For the sake of simplification, FIG. 5 shows only the component in a predetermined direction on the complex plane.

Referring to FIG. 5, correlation function $\rho_{n,d}$ (t) includes a peak P1 as the head arriving signal component. A peak P2 corresponding to the short delayed signal component immediately succeeds peak P2. Furthermore, there is a peak P3 corresponding to the long delayed signal component at a time behind peak P2 of the short delayed signal component.

The same applies to correlation function $\rho_{n,u}$ (t) for an interfering wave.

Figure 6:
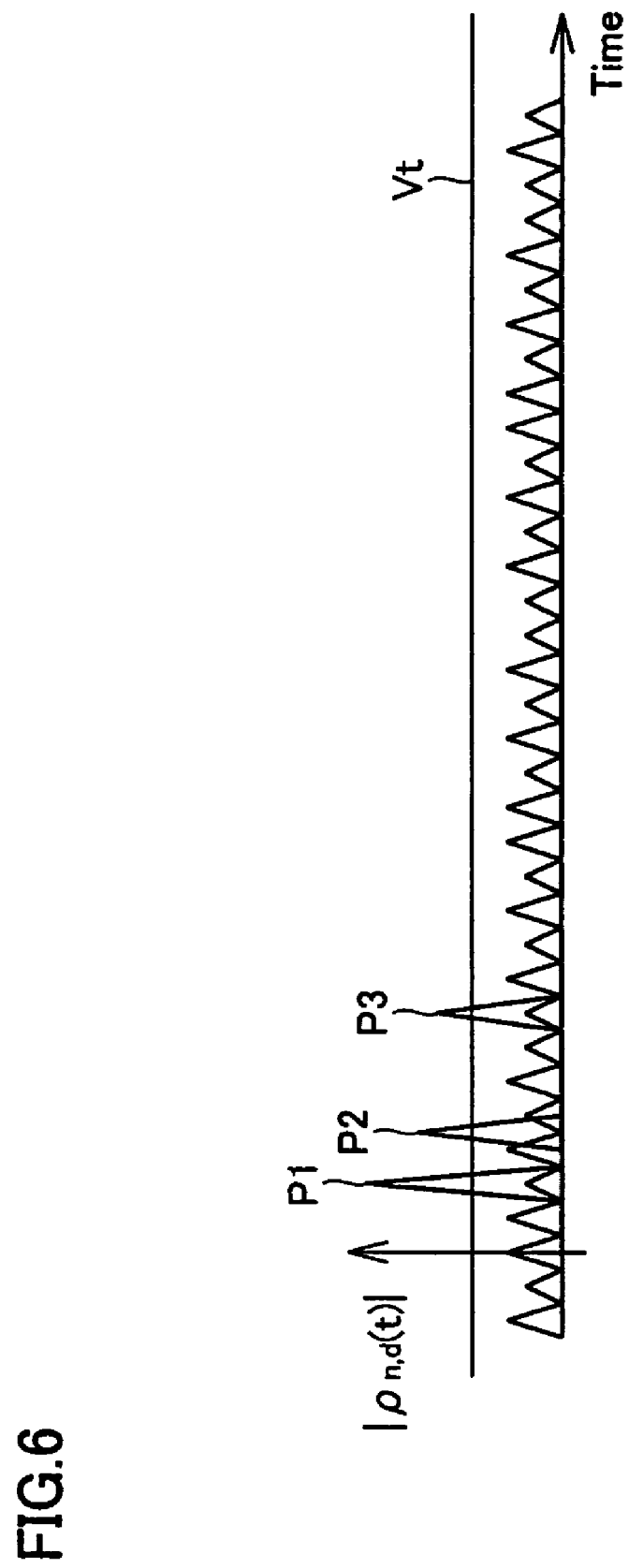
FIG. 6 represents the time dependency of an absolute value component of cross function $\rho_{n,d}(t)$ of FIG. 5.
Figure 8:
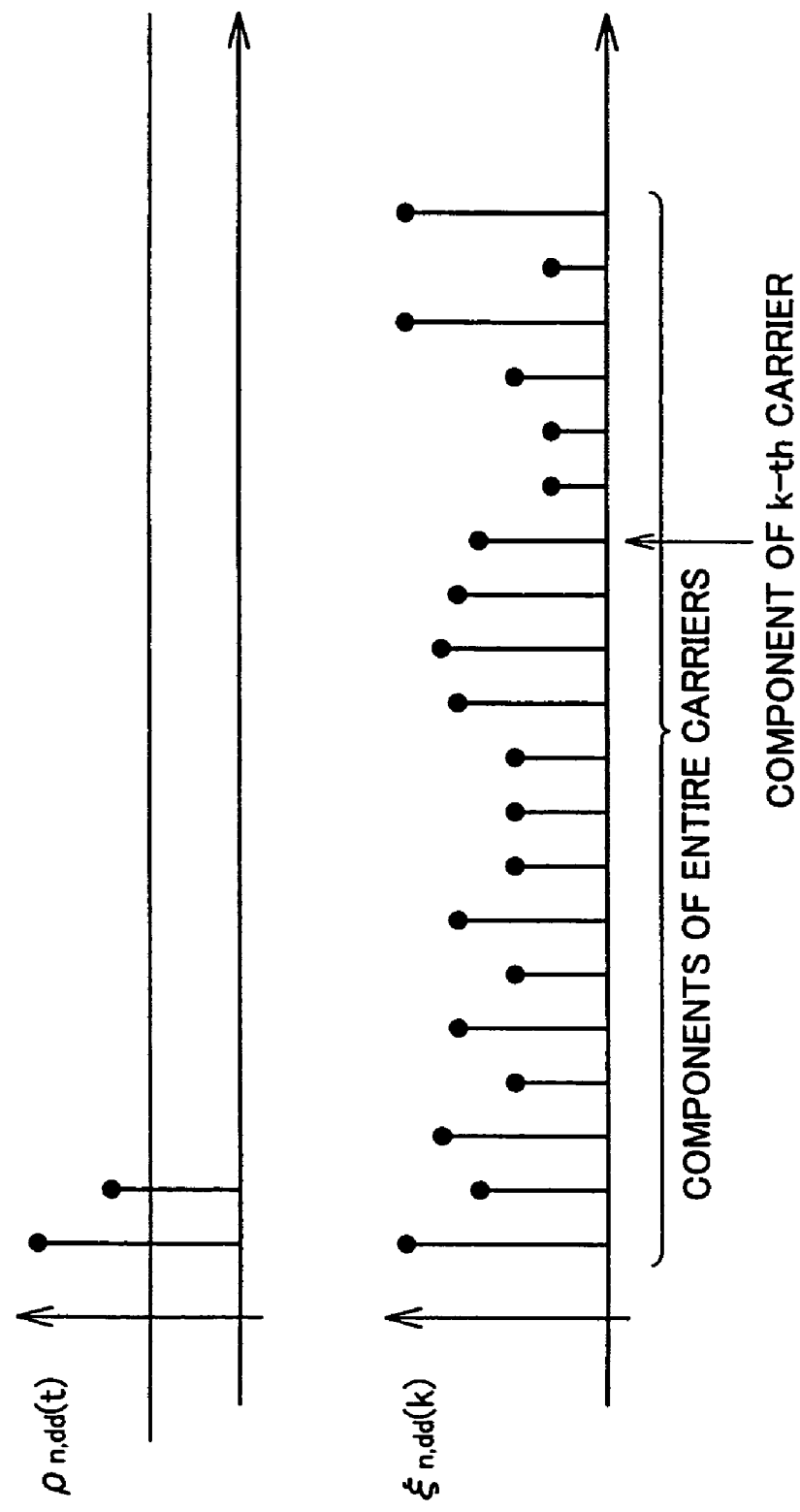
FIG. 8 represents a complex response $\rho_{n,dd}(t)$, and a complex response $\xi_{n,dd}(k)$ for each carrier obtained by fast Fourier transform thereon.

FIG. 6 represents the time dependency of the absolute value component of correlation function $\rho_{n,d}$ (t) shown in FIG. 8. In FIG. 6, value Vt indicates the threshold value used in the process that will be described afterwards.

[Operation of Reception Response Vector Estimator]

Correlation function $\rho_{n,d}$ (t) corresponds to the reception response (complex number) of a desired wave signal of the n-th antenna. The non-orthogonal component of noise and interference will remain in the complex response obtained by such correlation, leading to considerable error. However, the arriving time of the head arriving signal and the delay time of the arriving time of a delayed signal can be properly obtained by such correlation function $\rho_{n,d}$ (t).

In view of the foregoing, the procedure of obtaining more accurately the reception response of a wave from a desired user terminal and the reception response of a wave from an interfering user terminal using the delay time obtained by correlation functions $\rho_{n,d}$ (t) and $\rho_{n,u}$ (t) is performed by reception response vector estimator 1050 according to the steps set forth below.

(Step 1)

First, a threshold value Vt is preset for the absolute values $|\rho_{n,d}$ (t)$|$ and $|\rho_{n,u}$ (t)$|$ of the correlation functions shown in FIG. 6 to pick up signals equal to or exceeding the threshold value. As this threshold value Vt, a predetermined value is selected, or a standard such as extracting a signal lower than the highest signal level by a predetermined value is employed.

(Step 2)

Then, the complex response is accurately estimated by the so-called MMSE (Minimum Mean Square Error) method with respect to the signals picked up in which the mean square error between the array output and reference signal is taken as the minimum, as will be described hereinafter.

Attention is focused on one certain antenna. A signal train corresponding to sampled reception signals of the certain antenna is represented as below, identified as vector X.

$$X=[x_1, x_2, x_3, \ldots]^T \quad (19)$$

Although not particularly limited, the number of elements of such a vector can be set to, for example, 64 samples or 128 samples.

Signals corresponding to an inverse Fourier transform on reference signals of a desired wave are represented as $sd_1$, $sd_2$, $sd_3$, .... Assuming that the delayed signal of a desired wave arrives through a path k with a delay time of $\tau_k$, the reference signal for such a desired wave is represented as set forth below, corresponding to the vector formed of the above-described sampling values of reception signals.

$$d_k=[\square, \square, \ldots \square, sd_1, sd_2, \ldots]^T \quad (20)$$

In equation (20), a plurality of elements represented as $\square$ are present, corresponding in number to delay time $\tau_k$. For example, the value of the element represented as $\square$ will include the component of an inverse Fourier transform on the signal present in a guard interval, when present, located before a reference signal.

Consider the case where there is one interference signal, for the sake of simplification.

In a similar manner, the time series of elements corresponding to an inverse Fourier transform on the reference signals of an interference signal is represented as $su_1$, $su_2$, .... Assuming that the delayed signal of an interfering wave arrives through a path k' with the delay time of $\tau_{k'}$, the time series of reference signals of the interference signal is represented as set forth below, corresponding to vector X formed of sampling elements of a reception signal.

$$u_{k'}=[\square, \square, \ldots \square, su_1, su_2, \ldots]^T \quad (21)$$

In the estimation of a response vector based on MMSE, it is assumed that there are a plurality of, for example three, paths k having a different delay time for the desired wave, and also a plurality of, for example three, paths k' of an interfering wave.

Under the above-described terms, the process of obtaining the response vector for the reception signal of, for example, the n-th antenna, corresponds to obtaining a response $h_k$ and a response $\rho_{k'}$ for the desired wave and interfering wave, respectively, so as to minimize an evaluation function $J_1$ represented by the following equation (22).

$$J_1 = \left\| X - \sum_k h_k \cdot d_k - \sum_{k'} p_{k'} \cdot u_{k'} \right\|^2 \quad (22)$$

By defining matrix Q and vector a as equations (23) and (24), respectively, evaluation function $J_1$ is represented as equation (25).

$$Q = \begin{pmatrix} path1 & path2 & \cdots & pathk & path1' & path2' & \cdots & pathk' \\ sd_1 & \square & \cdots & \square & su_1 & \square & \cdots & \square \\ sd_2 & \square & \cdots & \square & su_2 & \square & \cdots & \square \\ sd_3 & sd_1 & \cdots & \square & su_3 & su_1 & \cdots & \square \\ \vdots & sd_2 & \cdots & \vdots & \vdots & su_2 & \cdots & \vdots \\ \vdots & \vdots & \vdots & \square & \vdots & \vdots & \vdots & \square \\ \vdots & \vdots & \vdots & sd_1 & \vdots & \vdots & \vdots & su_1 \\ \vdots & \vdots & \vdots & \vdots & \vdots & \vdots & \vdots & \vdots \end{pmatrix} \quad (23)$$

$$a = \begin{pmatrix} h_1 \\ h_2 \\ \vdots \\ p_1 \\ p_2 \\ \vdots \end{pmatrix} \quad (24)$$

$$J_1 = \|X - Qa\|^2$$
$$= (X-Qa)^H(X-Qa)$$
$$= X^H X - X^H Qa - a^H Q^H X + a^H Q^H Qa \quad (25)$$

Under the prerequisite of this evaluation function $J_1$ being minimum for vector a, vector a can be obtained as equation (26) by the steps set forth below.

$$\frac{\partial}{\partial a} J_1 = \frac{\partial}{\partial a}(X^H X) - \frac{\partial}{\partial a}(X^H Qa) - \frac{\partial}{\partial a}(a^H Q^H X) + \frac{\partial}{\partial a}(a^H Q^H Qa) \quad (26)$$
$$= 0 - 0 - 2Q^H X + 2Q^H Qa = 0$$

$$\therefore a = (Q^H Q)^{-1} Q^H x$$

Thus, the complex amplitude of each path for a desired signal and an interference signal can be obtained.

The above-described procedure is based on the provision for the n-th antenna. This procedure is similarly carried out for other antennas to obtain the response of a desired wave and the interfering wave for each antenna.

(Step 3)

Signals other than those picked up as having at least the threshold value and having the complex response estimated are all set to the signal level of 0.

Accordingly, the remaining noise and interfering component can be removed.

(Step 4)

For a delayed time longer than the guard interval time, the complex response is set to 0. As to a signal of a complex response formed only of a component corresponding to a delayed wave within the guard interval time, the reception response of $\rho_{n,dd}$ (t) is placed for a desired wave whereas a reception response (correlation function) of $\rho_{n,ud}$ (t) is placed for an interfering wave. The subscript "dd" denotes a signal within the guard interval for a desired wave. Subscript "ud" denotes a signal within the guard interval for an interfering wave.

(Step 5)

In a similar manner, for a delayed wave shorter than the guard interval time, all the complex responses are set to 0. A response with other complex response levels left is newly set as a response (correlation function) $\rho_{n,du}$ (t) and a response (correlation function) $\rho_{n,uu}$ (t) for a desired wave and an interfering wave, respectively.

The subscript "du" denotes a delayed wave longer than the guard interval time for a desired wave. Subscript "uu" denotes a delayed wave having a delay time longer than the guard interval time for an interfering wave.

The response for an interfering wave obtained as described above corresponds to the complex response for multiple user in SDMA.

Figure 7:
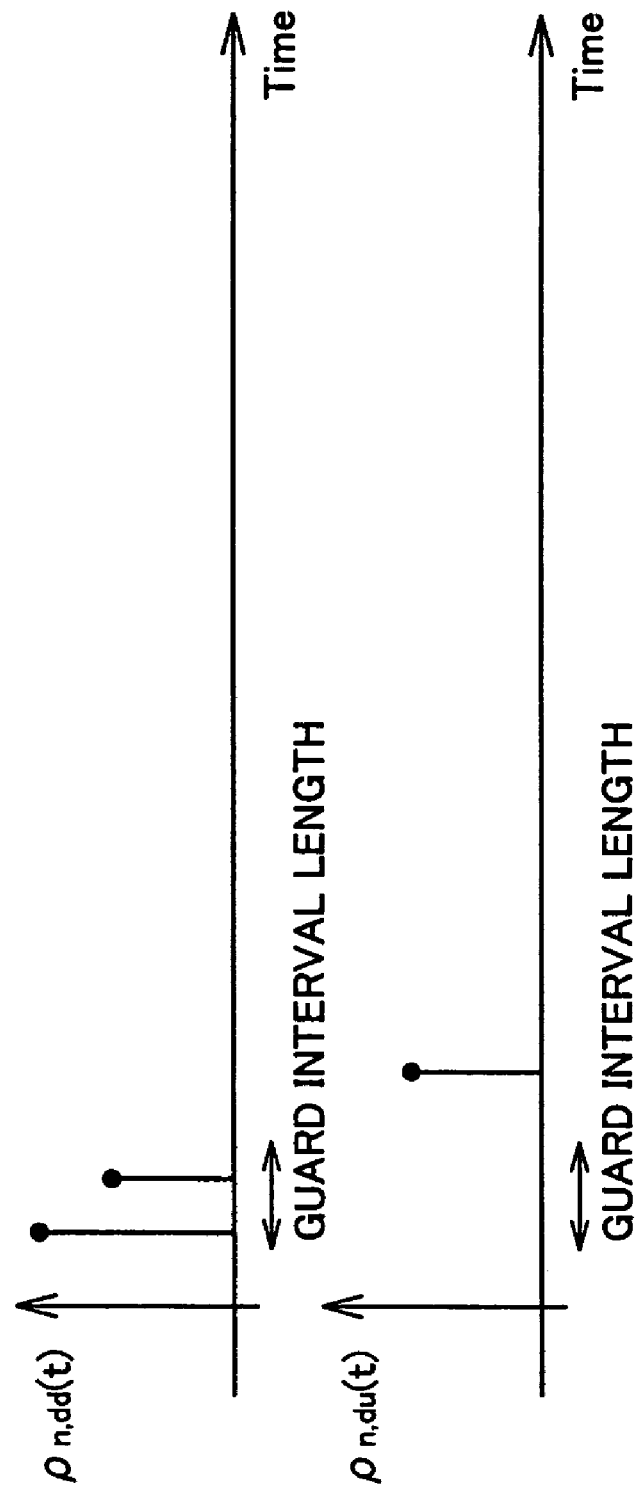
FIG. 7 shows the time change of a response $\rho_{n,\,dd}(t)$ and a response $\rho_{n,du}(t)$.

FIG. 7 represents the time variation of response $\rho_{n,dd}$ (t) and response $\rho_{n,du}$ (t) calculated as described above.

There are three paths in FIG. 7. The signals from paths 1 and 2 for the head arriving wave and the first delayed wave have arrived at the base station within the guard interval length. The delayed wave corresponding to path 3 has arrived at adaptive array base station 1000 at an elapse of a delayed time of at least the guard interval time from the arriving time of the head wave.

Therefore, response $\rho_{n,dd}$ (t) includes two peaks whereas response $\rho_{n,du}$ (t) includes one peak.

Through the above procedure, a first response vector formed of the response of each antenna corresponding to response $\rho_{n,dd}$ (t) and a second response vector formed of the response of each antenna corresponding to response $\rho_{n,du}$ (t) are provided for a desired wave.

The same applies for the response of an interfering wave. A third response vector formed of the response of each antenna corresponding to response $\rho_{n,ud}$ (t) and a fourth response vector formed of the response of each antenna corresponding to response $\rho_{n,uu}$ (t) are provided.

In the case where there are m (m≧2) interfering waves, the same applies for the interfering wave of the m-th wave. The (2m+1)th response vector formed of the response of each antenna corresponding to a complex response including only the component corresponding to a delayed wave within the guard interval period and the (2m+2)th response vector formed of the response of each antenna corresponding to a complex response left with only the component corresponding to a delayed wave after the guard interval time are provided.

[Operation of FFT Units 1060.1-1060.n]

Thus, a response for each antenna is obtained at reception response vector estimator 1050.

Then, FFT units 1060.1-1060.n perform the process set forth below.

Complex response $\rho_{n,dd}$ (t) of a signal transmitted from a desired terminal and arriving within the guard interval is subjected to fast Fourier transform to be converted into a complex response $\xi_{n,dd}$ (k) for each carrier, where k is the carrier number.

FIG. 8 shows complex response $\rho_{n,dd}$ (t) and a corresponding complex response $\xi_{n,dd}$ (k) for each carrier obtained by fast Fourier transform.

A similar operation is carried out on all the antennas to calculate the complex response for each carrier of all the antennas. A response vector with the complex response of each carrier as an element is calculated. Furthermore, complex response $\rho_{n,du}$ (t) is subjected to fast Fourier transform to obtain complex response $\xi_{n,du}$ (k) for each carrier.

Through the above process, a response vector $d_d$ (k) for a signal arriving within the guard interval period for the k-th carrier, for example, is represented by equation (27). In a similar manner, the response vector $d_u$ (k) of the kth carrier from complex response $\rho_{n,du}$ (t) of a signal arriving at a delay time of at least the guard interval, transmitted from a desired terminal, is calculated by equation (28).

$$d_d(k)=[\xi_{1,dd}(k), \xi_{2,dd}(k), \ldots, \xi_{n,dd}(k)]^T \quad (27)$$

$$d_u(k)=[\xi_{1,du}(k), \xi_{2,du}(k), \ldots, \xi_{n,du}(k)]^T \quad (28)$$

In a similar manner, complex response $\rho_{n,ud}$ (t) of a signal transmitted from an interfering user (all connected users other than the desired user in SDMA) and arriving within the guard interval is subjected to fast Fourier transform to be converted into a response $\xi_{n,ud}$ (k) for each carrier. A response vector $i_d$ (k) of the k-th carrier of an interfering wave is calculated by equation (29).

In a similar manner, complex response $\rho_{n,uu}$ (t) of a signal arriving after the guard interval period for an interfering wave is subjected to fast Fourier transform to be converted into a response $\xi_{n,uu}$ (k) for each carrier. A response vector $i_u$ (k) for an interfering wave arriving at a delay time of at least the guard interval is represented by equation (30).

$$i_d(k)=[\xi_{1,ud}(k), \xi_{2,ud}(k), \ldots, \xi_{n,ud}(k)]^T \quad (29)$$

$$i_u(k)=[\xi_{1,uu}(k), \xi_{2,uu}(k), \ldots, \xi_{n,uu}(k)]^T \quad (30)$$

In the case where there are a plurality of interferences or multiple users, such a response vector is calculated for each interfering wave or multiple user.

[Operation of Reception Weight Calculator]

Based on the response vector of the k-th carrier for each antenna obtained by fast Fourier transform as described above, reception weight calculator 1070.k calculates the reception weight vector for the k-th carrier as set forth below.

The response vector $d_d$ (k) of a desired wave of a delay time within the guard interval, the response vector $d_u$ (k) of a desired wave of a delay time exceeding the guard interval, the response vector $i_d$ (k)$'$ of an interfering wave of a delay time within the guard interval, and the response vector $i_u$ (k) of an interfering wave with a delay time exceeding the guard interval for the k-th carrier are obtained by FFT units 1060.1-1060.n as below.

$$d_d(k)=[\xi_{1,dd}(k), \xi_{2,dd}(k), \ldots, \xi_{n,dd}(k)]^T$$

$$d_u(k)=[\xi_{1,du}(k), \xi_{2,du}(k), \ldots, \xi_{n,du}(k)]^T$$

$$i_d(k)=[\xi_{1,ud}(k), \xi_{2,ud}(k), \ldots, \xi_{n,ud}(k)]^T$$

$$i_d(k)=[\xi_{1,uu}(k), \xi_{2,uu}(k), \ldots, \xi_{n,uu}(k)]^T \quad (31)$$

From these signals, the correlation matrix $R_{XX}^{(k)}$ of the k-th carrier is obtained by equation (32), whereby the reception weight vector of a desired signal is calculated by equation (33).

Furthermore, the reception weight vector for a party of a multiple signal in the case of SDMA is calculated by equation (34).

$$R_{xx}^{(k)}=d_d{}^*(k)d_d(k)^T+d_u{}^*(k)d_u(k)^T+i_d{}^*(k)i_d(k)^T+i_u{}^*(k)i_u(k)^T+\sigma^2 I \quad (32)$$

$$W_d^{(k)}=R_{xx}^{(k)-1}d_d{}^*(k) \quad (33)$$

$$W_i^{(k)}=R_{xx}^{(k)-1}i_d{}^*(k) \quad (34)$$

In equation (32), $\sigma^2$ is a positive real number. This value may be obtained empirically, avoiding singularity of the correlation matrix. Alternatively, a value of thermal noise power of the system may be selected. I represents the unit matrix of n×n.

In the case there is no interfering wave, the term corresponding to the interfering wave in equation (32) becomes 0. The reception weight vector of a desired signal is also calculated by equation (33), even for only a desired wave.

Figure 9:
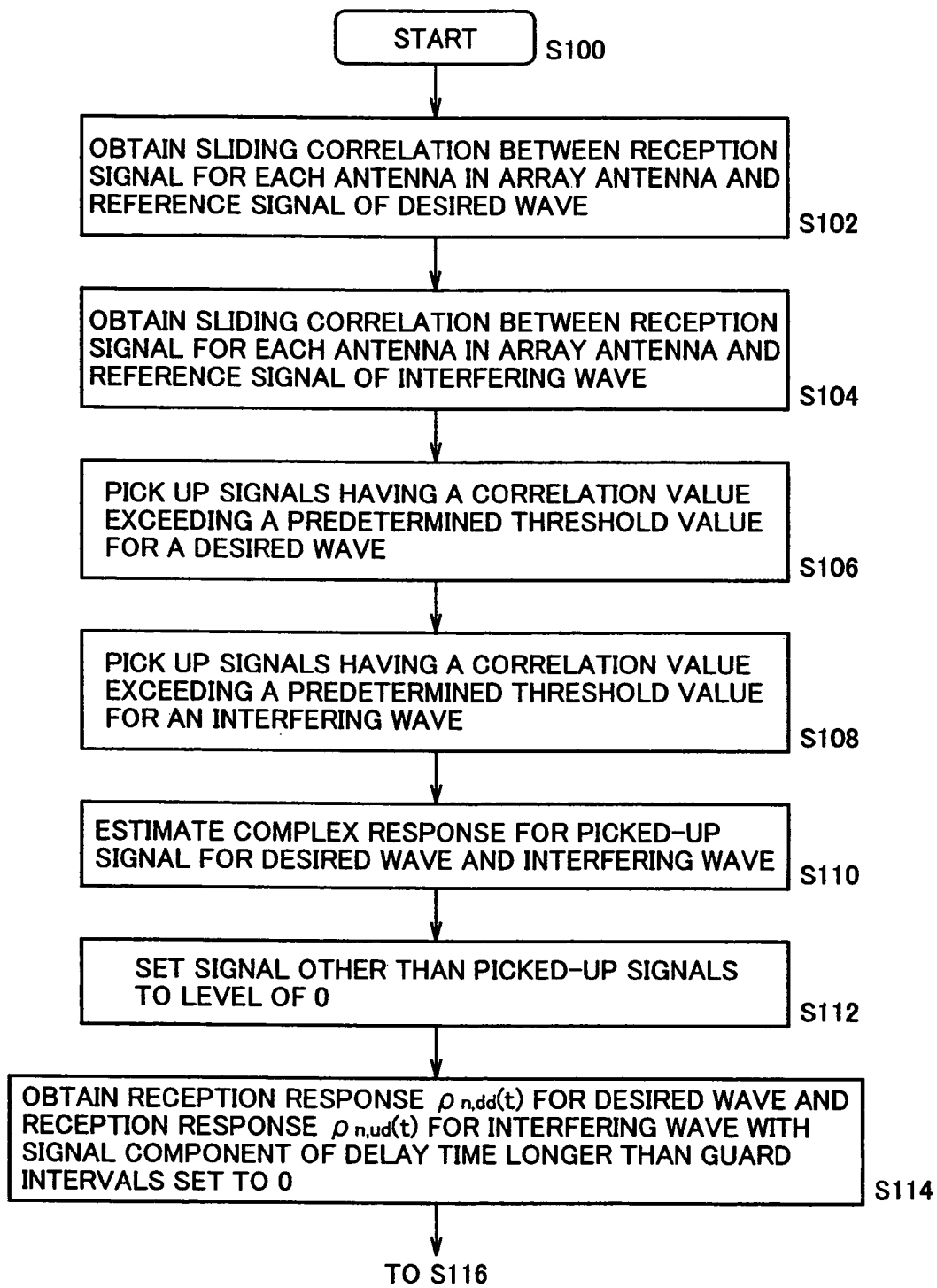
FIG. 9 is a first flow chart to describe an overall operation of adaptive array base station 1000.
Figure 10:
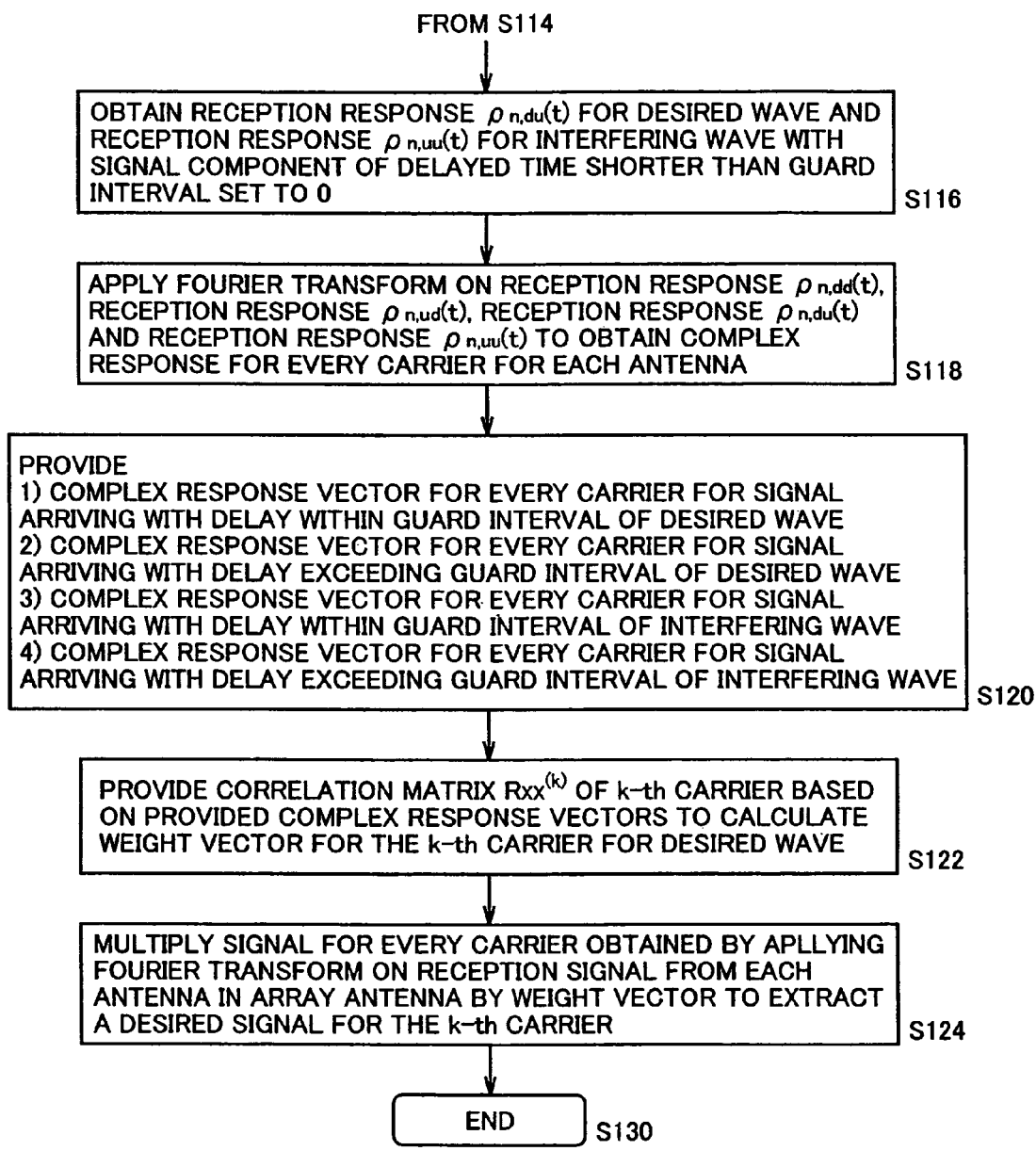
FIG. 10 is a second flow chart to describe an overall operation of adaptive array base station 1000.
Figure 11:
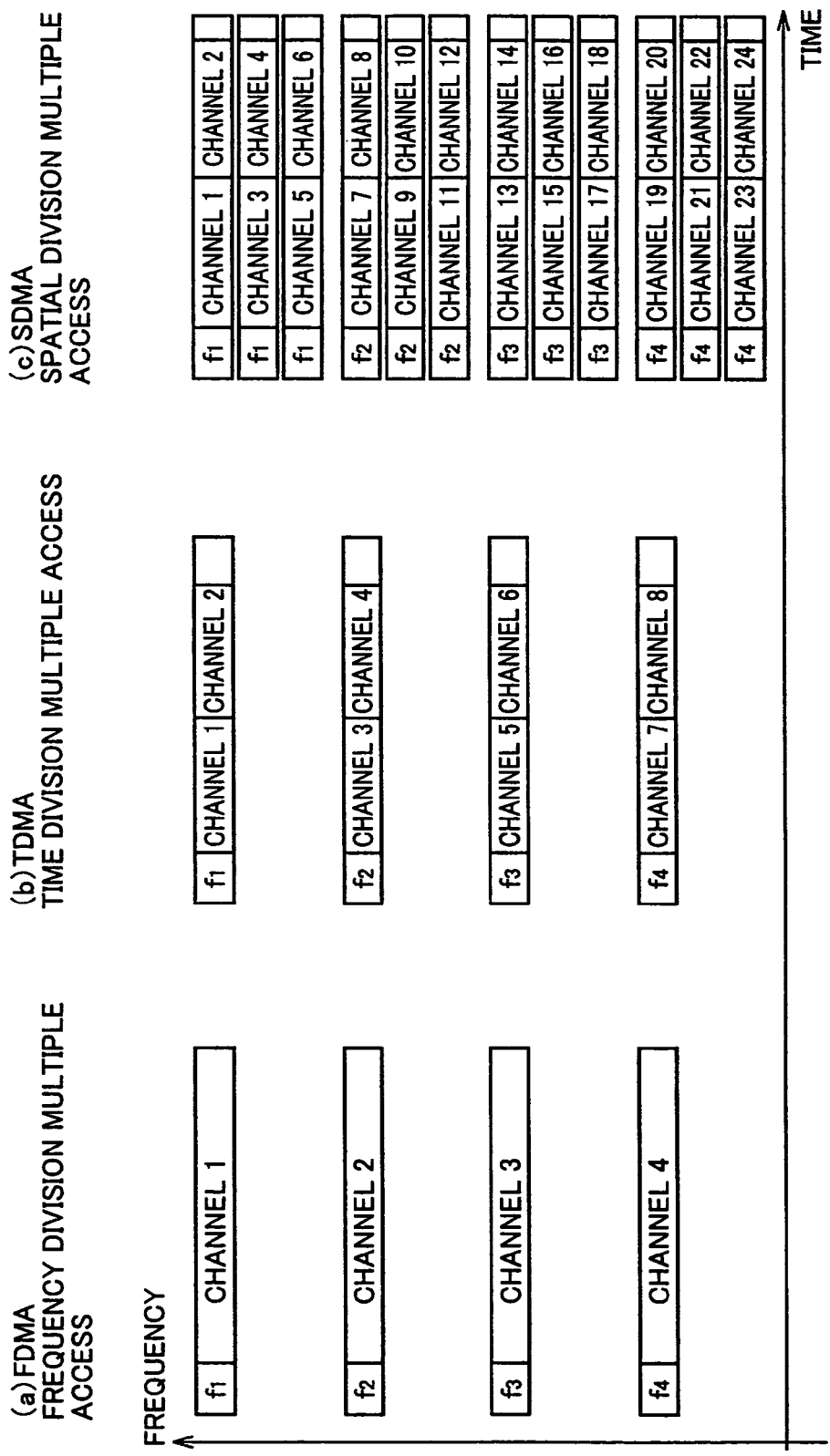
FIG. 11 shows an arrangement of a channel in each type of communication system of frequency division multiple access, time division multiple access and spatial division multiple access.
Figure 12:
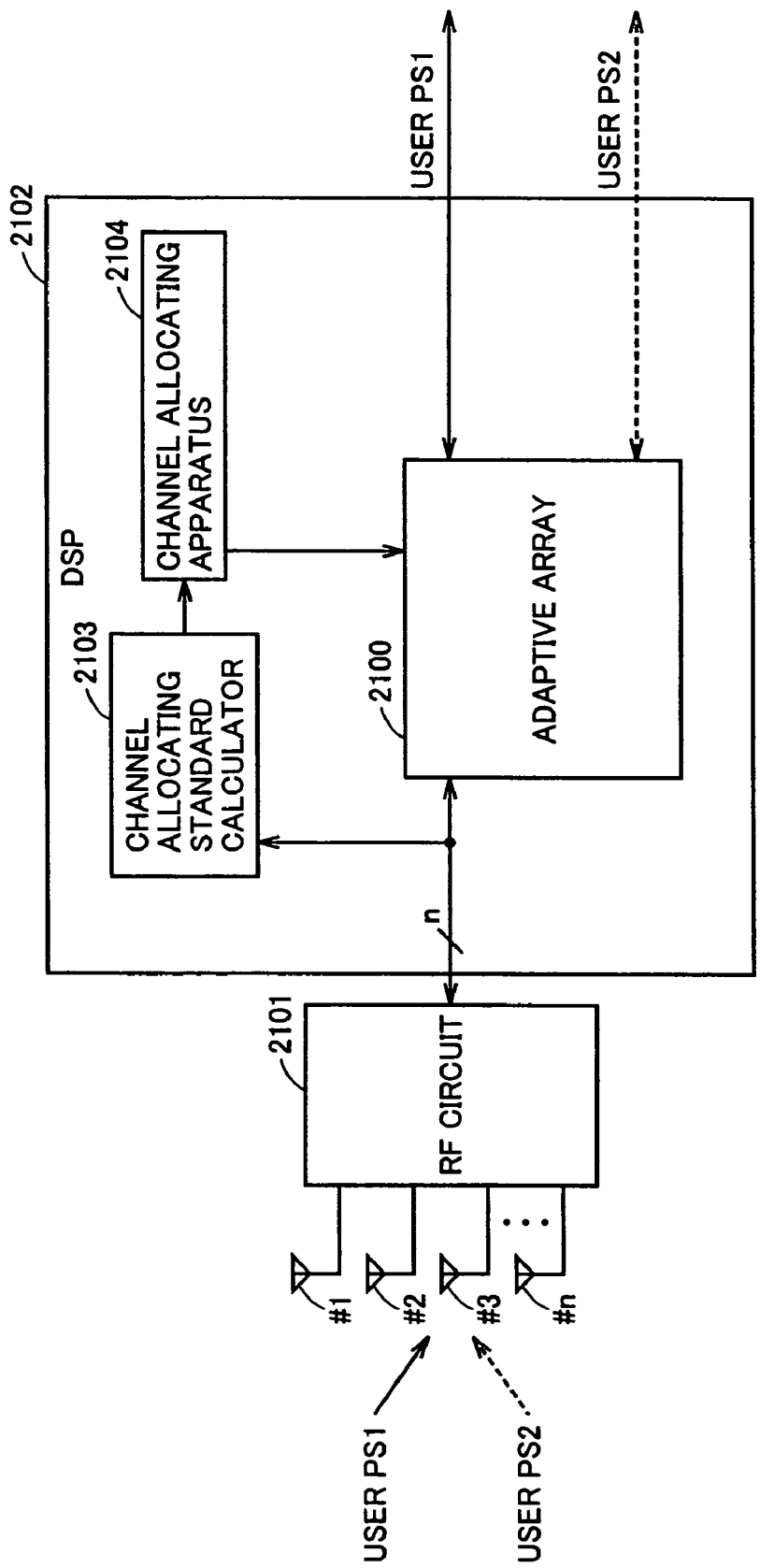
FIG. 12 is a schematic block diagram showing a structure of a transmission and reception system 2000 of a conventional SDMA base station.
Figure 13:
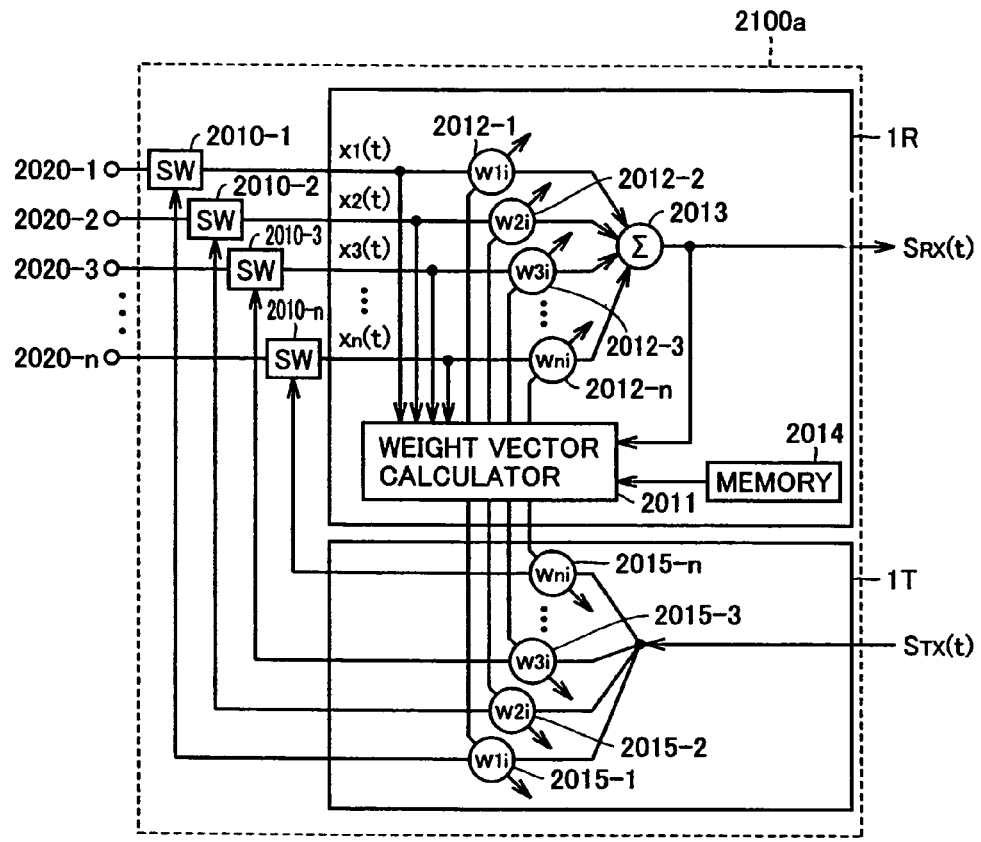
FIG. 13 is a block diagram showing a configuration of a transmission and reception unit 2100a corresponding to one user in adaptive array 2100.
Figure 14:
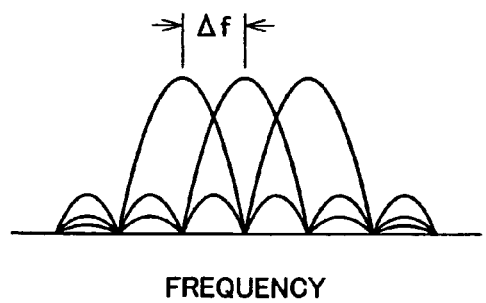
FIG. 14 is an extraction of three carriers among the frequency spectrum of a plurality of carriers (carrier waves) employed in the OFDM scheme.
Figure 15:
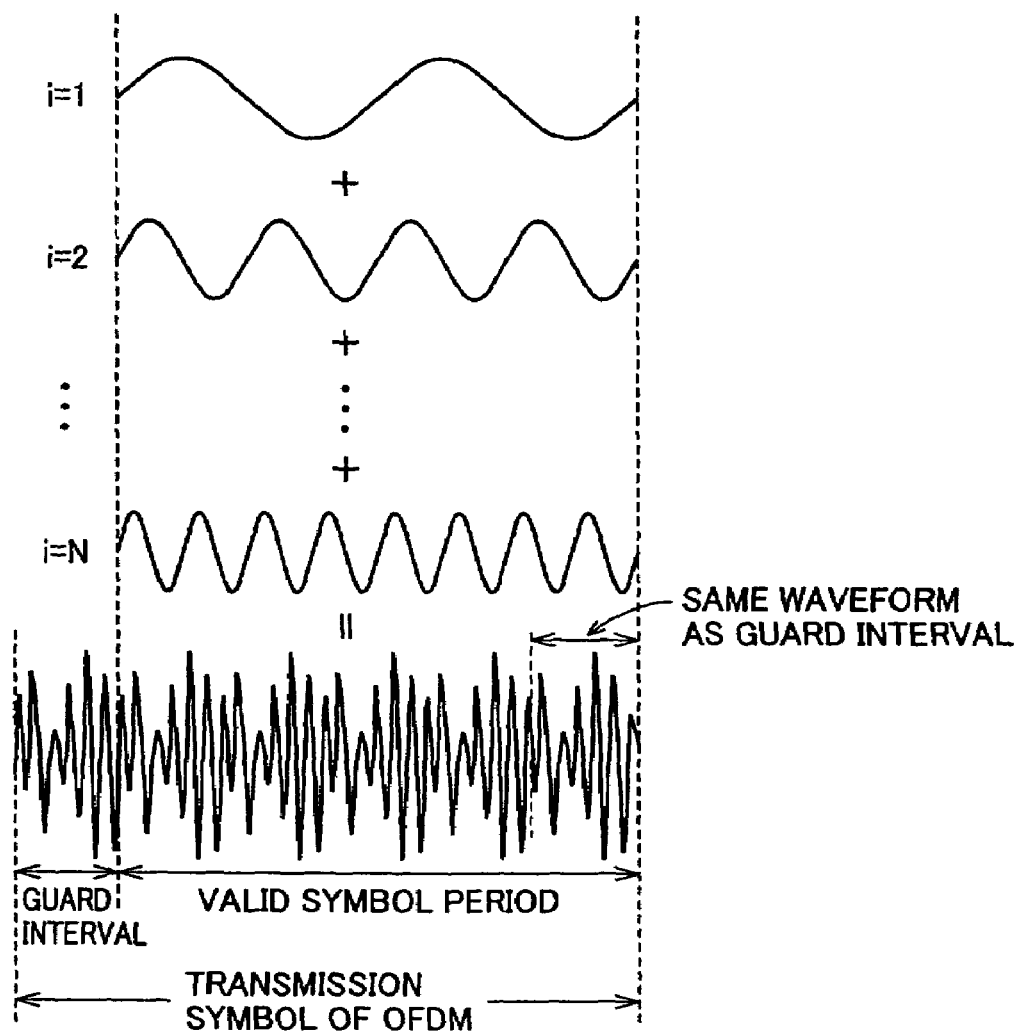
FIG. 15 represents a waveform of a transmission symbol transmitted by the OFDM scheme.
Figure 16:
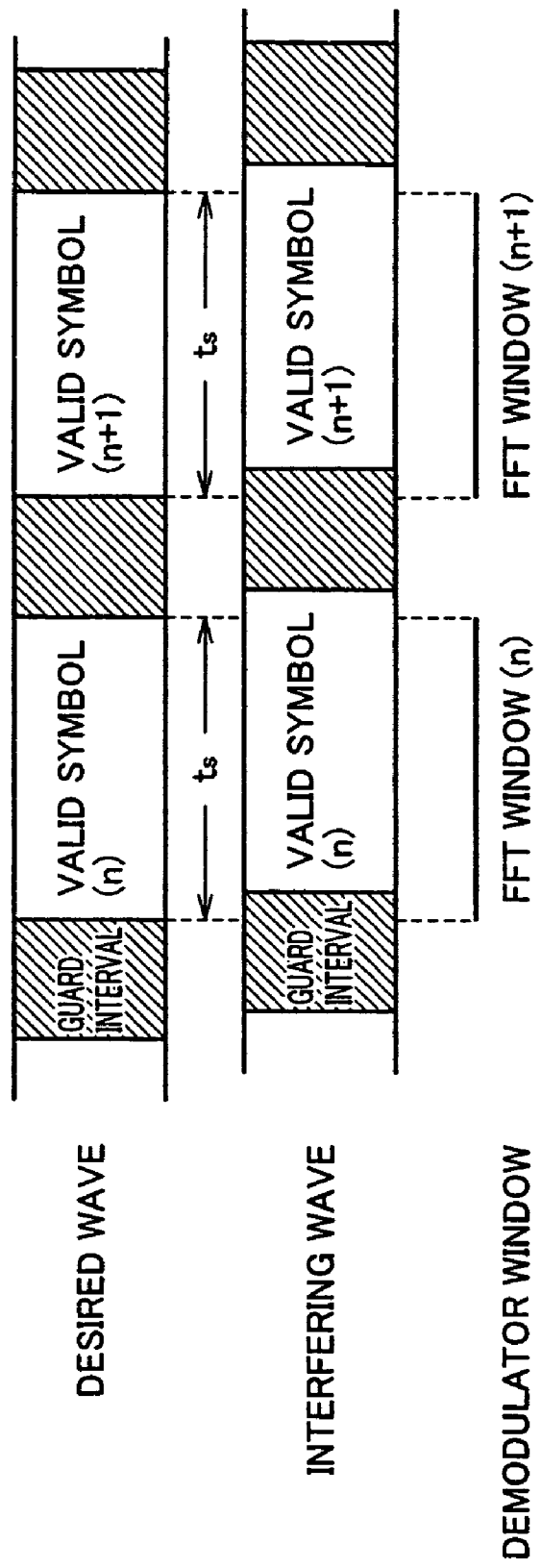
FIG. 16 is a schematic diagram to describe a demodulation operation when a desired wave and an interfering wave are received.
Figure 17:
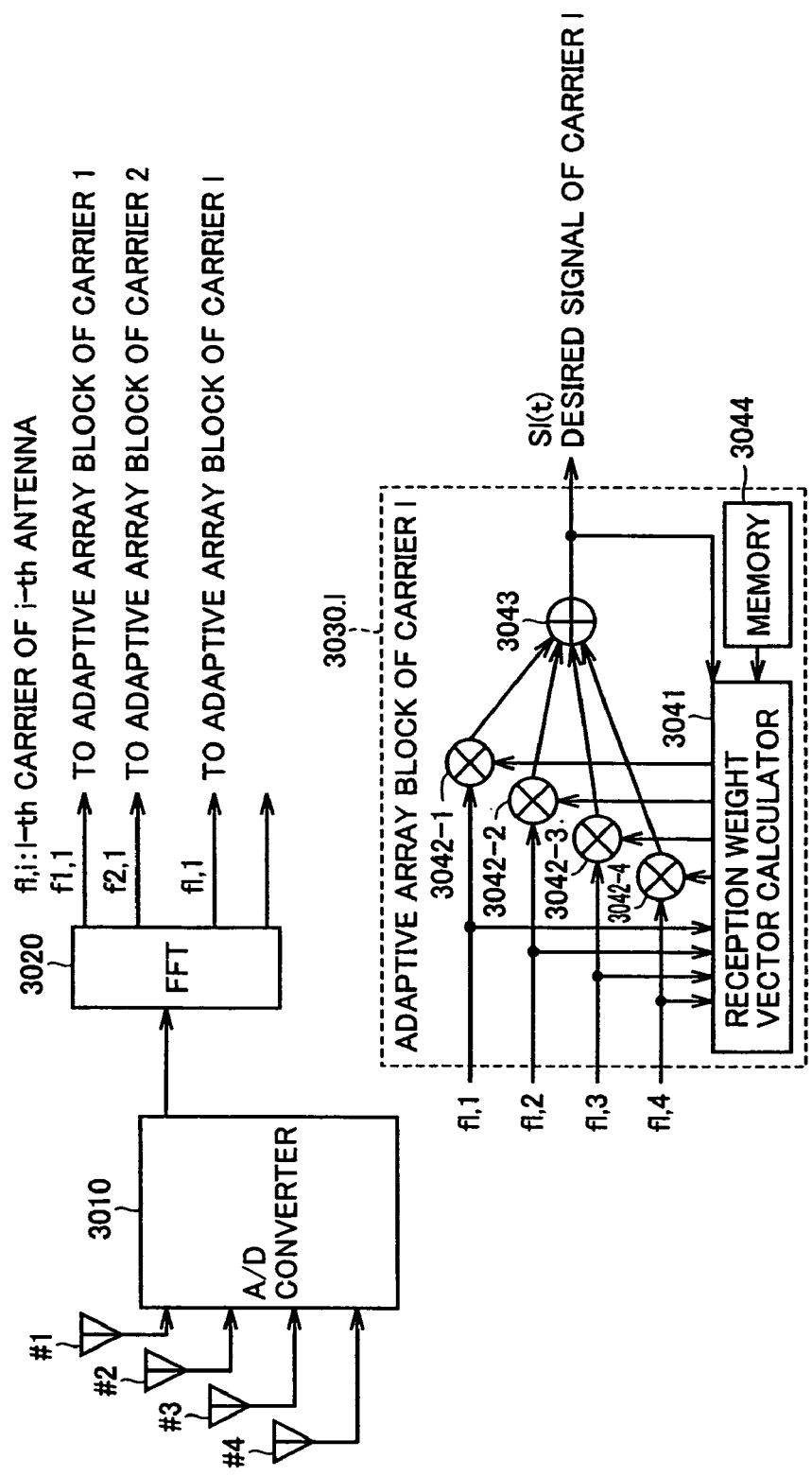
FIG. 17 is schematic block diagram to describe a configuration of an adaptive array base station 3000.
Figure 18:
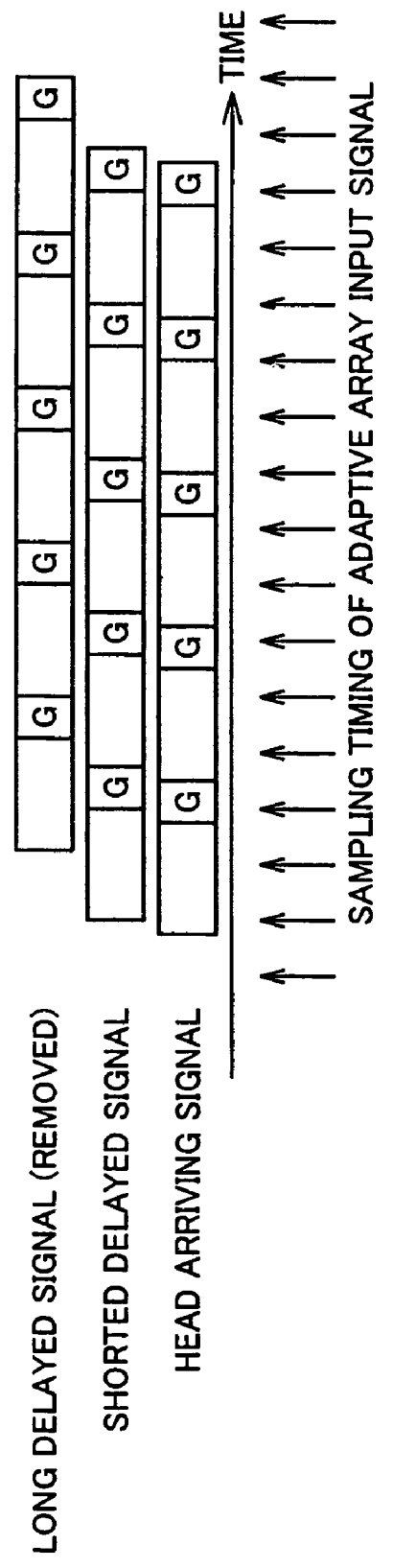
FIG. 18 is a schematic diagram representing a timing of a signal received by adaptive array base station 3000 shown in FIG. 17.
Figure 19:
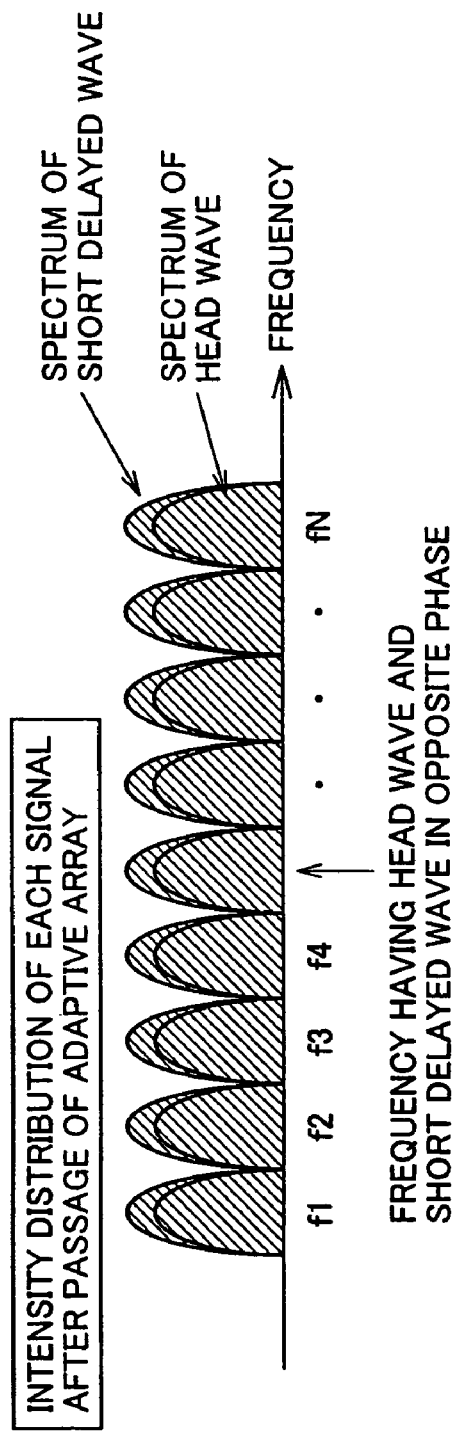
FIG. 19 represents an intensity distribution of a signal corresponding to each carrier after passing through the adaptive array.
Figure 20:
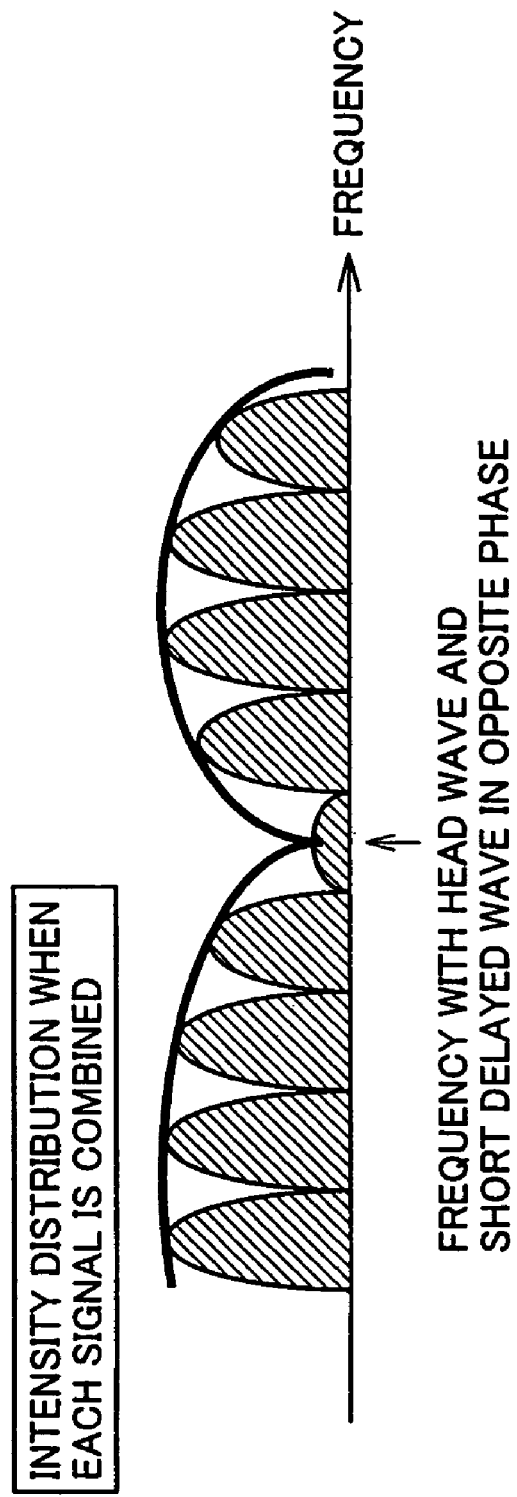
FIG. 20 represents an intensity distribution when signals of respective carriers are combined in the case shown in FIG. 19.
Figure 21:
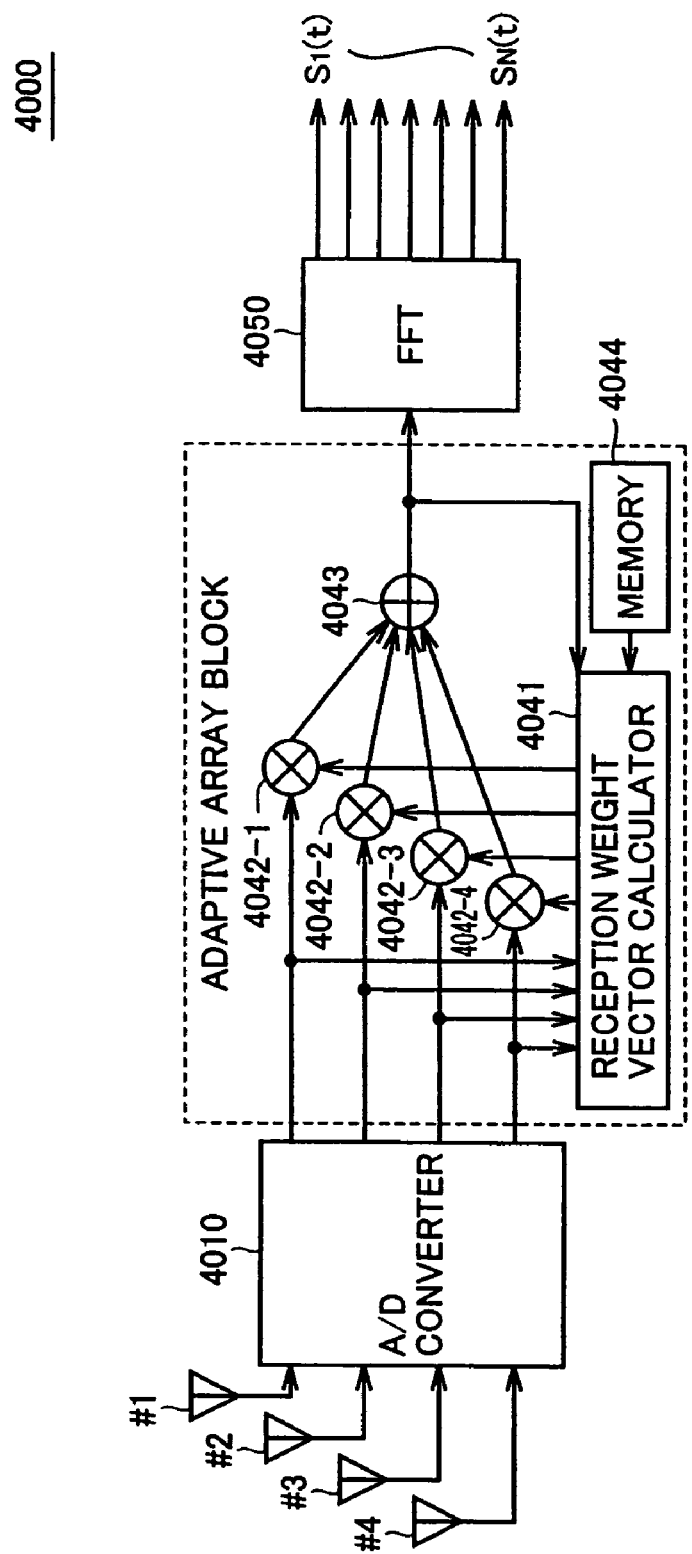
FIG. 21 is a schematic block diagram to describe a configuration of an adaptive array base station 4000.
Figure 22:
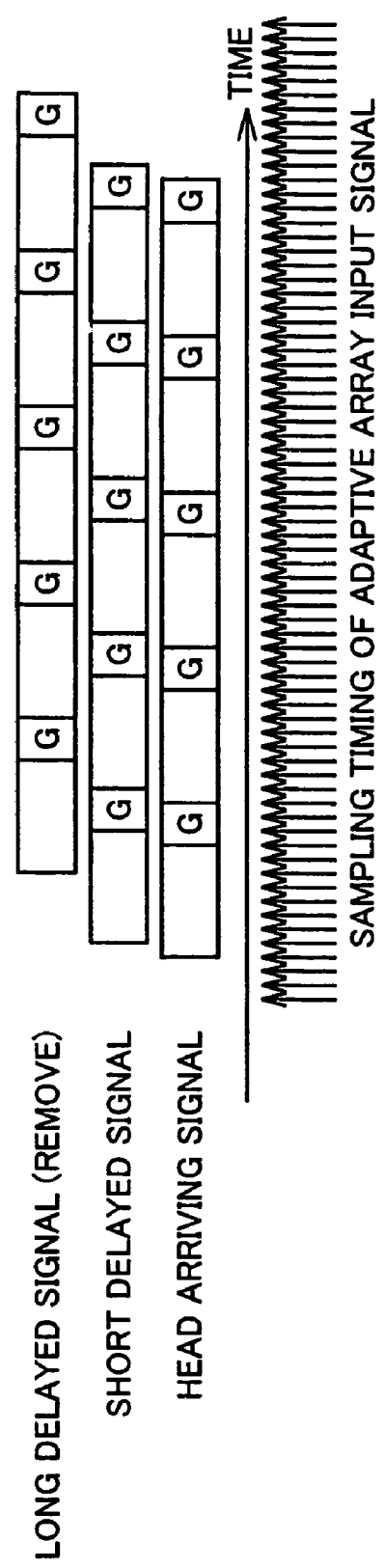
FIG. 22 is a schematic diagram to describe an operation of adaptive array base station 4000 of FIG. 21.

FIGS. 9 and 10 are flow charts to describe the overall operation of adaptive array base station 100.

Referring to FIG. 9, upon initiation of the process (step S100), the sliding correlation between the reception signal for each antenna of the array antenna and the reference signal of a desired wave is taken in correlator 1030 (step S102).

At correlator 1030, the sliding correlation between the reception signal and reference signal of an interfering wave for each antenna of the array antenna is also obtained (step S104).

At reception response vector estimator 1050, a signal having the absolute value of a correlation value exceeding a predetermined threshold value for a desired wave and a signal having an absolute value of a correlation value exceeding the predetermined threshold value for an interfering wave are picked up (step S106, S108).

At reception response vector estimator 1050, the complex response for the signals picked up is estimated by MMSE and the like for a desired wave and an interfering wave (step S110). All the signals other than the signals picked up are set to the signal level of 0 (step S112).

Then, at reception response vector estimator 1050, a reception response $\rho_{n,dd}$ (t) for a desired wave and a reception response $\rho_{n,ud}$ (t) for an interfering wave are obtained with the signal component of a delay time longer than the guard interval set to 0 (step S114). Reception response vector estimator 1050 also obtains a reception response $\rho_{n,du}$ (t) for a desired wave and a reception response $\rho_{n,uu}$ (t) for an interfering wave with the signal component of a delay time shorter than the guard interval set to 0 (step S116).

Referring to FIG. 10, FFT units 1060.1-1060.n apply Fourier transform on reception response $\rho_{n,dd}$ (t), reception response $\rho_{n,ud}$ (t), reception response $\rho_{n,du}$ (t) and reception response $\rho_{n,uu}$ (t) to obtain the complex response of each carrier for each antenna (step S118).

Accordingly, 1) a complex response vector $d_d$ (k) for every carrier corresponding to a signal arriving with a delay within the guard interval of the desired wave, 2) a complex response vector $d_u$ (k) for every carrier corresponding to a signal arriving with a delay exceeding the guard interval of the desired wave, 3) a complex response vector $i_d$ (k) for every carrier corresponding to a signal arriving with a delay within the guard interval of an interfering wave, and 4) a complex response vector $i_u$ (k) for every carrier corresponding to a signal arriving with a delay exceeding the guard interval of the interfering wave are provided (step S120).

At reception weight calculator 1072.k, a correlation matrix $R_{XX}^{(k)}$ of the k-th carrier is provided, based on the calculated complex response vector. The weight vector for the k-th carrier is calculated with respect to a desired wave (step S122).

At multipliers 1080-1 to 1080-n and adder 1090, the signal of each carrier obtained by applying Fourier transform on the reception signal from each antenna in the array antenna is multiplied by the weight vector to extract the desired signal for the k-th carrier (step 124). In the SDMA scheme, the weight vector is obtained also for an interfering wave, if necessary, to extract an interfering wave.

Furthermore, by combining the components for each carrier, the signal transmitted through the OFDM scheme can be demodulated. Thus, the processing ends (step S130).

The reason why a short delayed signal is combined without being attenuated by the phase difference from the head arriving wave in the above method may be due to an adaptive array operation being carried out so as to direct the beam to each of the head signal and short delayed signal for every carrier since response vector $d_d(k)$ for each carrier includes both the components of the head signal and short delayed signal.

Therefore, combination in opposite phase will not occur even if the carrier frequency differs. Also, since there are four terms of a significant signal component from the equation of a correlation matrix $R_{xx}(k)$ (in the case where there is one interference), the consumed degree of freedom is 3. Control in a complete null direction is allowed with an antenna of, for example, 4 elements.

In the case where null control is to be conducted on all the signals without depending upon the above-described scheme, control to direct null to a short delay will also have to be provided. In this case, the degree of freedom is insufficient for an antenna of 4 elements. Sufficient properties cannot be achieved.

Second Embodiment

In the first embodiment, a complex response of a desired signal and a complex response of an interfering signal were obtained in accordance with a method described with reference to equations (22)-(26) as an operation of reception response vector estimator 1050.

In the case where there is no overlapping between the reference signal section of a desired signal and the reference signal section of an interfering signal, the method described in accordance with equations (22)-(26) does not exactly apply.

The second embodiment is directed to a method of obtaining a complex response of a desired signal and a complex response of an interference signal applicable even in such a case.

(Estimation of Response of Desired Signal)

To obtain the complex response of a desired signal, an evaluation function $J_2$ applied by the following equation (35) is employed. Unless stated otherwise, the notations of the following equations are similar to those of equations (22)-(26).

$$J_2 = \left\| X - \sum_k h_k \cdot d_k \right\|^2 \quad (35)$$

A matrix Q' and a vector h defined by the following equations (36) and (37), respectively, are to be used.

$$Q' = \begin{pmatrix} sd_1 & \square & \cdots \\ sd_2 & \square & \cdots \\ sd_3 & sd_1 & \cdots \\ \vdots & sd_2 & \cdots \\ \vdots & sd_3 & \cdots \\ \vdots & \vdots & \cdots \\ \vdots & \vdots & \cdots \end{pmatrix} \quad (36)$$

$$h = \begin{pmatrix} h_1 \\ h_2 \\ h_3 \\ \vdots \\ \vdots \\ \vdots \end{pmatrix} \quad (37)$$

Equation (35) can be rewritten as below.

$$J_2 = \|X - Q'h\|^2 \quad (38)$$

Based on the prerequisite of being minimum for vector h, complex response $h_k$ for a path k of a desired wave is obtained by the following equation (39), likewise equation (26).

$$h = (Q'^H Q')^{-1} Q'X \quad (39)$$

(Estimation of Response of Interfering Signal)

In obtaining a complex response of an interfering signal, an evaluation function $J_3$ applied by the following equation (40) is employed.

$$J_3 = \left\| X - \sum_{k'} P_{k'} \cdot u_{k'} \right\|^2 \quad (40)$$

A matrix Q" and a vector p defined by equations (41) and (42), respectively, are employed.

$$Q' = \begin{pmatrix} su_1 & \square & \cdots \\ su_2 & \square & \cdots \\ su_3 & su_1 & \cdots \\ \vdots & su_2 & \cdots \\ \vdots & su_3 & \cdots \\ \vdots & \vdots & \cdots \\ \vdots & \vdots & \cdots \end{pmatrix} \quad (41)$$

$$p = \begin{pmatrix} p_1 \\ p_2 \\ p_3 \\ \vdots \\ \vdots \\ \vdots \end{pmatrix} \quad (42)$$

Equation (40) is rewritten as below.

$$J_3 = \|X - Q''p\|^2 \quad (43)$$

Based on the prerequisite of being minimum for vector p, a complex response $p_{k'}$ for a path k' of an interfering wave is obtained by the following equation (44).

$$p = (Q''^H Q'')^{-1} Q'' X \quad (44)$$

Advantages similar to those of the first embodiment can be provided through reception response vector estimator 1050 performing the above-described estimation method of a complex response.

As described above, usage of a configuration of an adaptive array base station of the present invention allows a multipath signal within a guard interval to be combined at the maximum ratio to maximize the reception sensitivity. Furthermore, the antenna degree of freedom is not consumed when a multipath signal within the guard interval is combined. The interference suppression performance can be maintained.

INDUSTRIAL APPLICABILITY

According to a radio apparatus and adaptive array processing method of the present invention described above, the reception sensitivity can be improved even in the case of adaptive array reception for the OFDM transmission scheme. The present invention is particularly useful in an adaptive array base station.

The invention claimed is:

1. A radio apparatus to transmit and receive a signal transmitted with a guard interval section added to each valid symbol section by an orthogonal frequency division communication scheme employing a plurality of carriers, comprising:
   an array antenna including a plurality of antennas,
   arrival timing detection means for detecting an arriving timing of a desired wave from signals received by said array antenna,
   reception response vector estimation means for estimating a first response vector for a signal arriving within said guard interval section from a head arriving wave out of said desired wave, and a second response vector for a signal arriving after said guard interval section from the head arriving wave out of said desired wave,
   first Fourier transform means for applying Fourier transform on said first and second response vectors to extract components for respective ones of said plurality of carriers,
   second Fourier transform means for applying Fourier transform on reception signals from said array antenna to extract components for respective carriers of reception signals of respective ones of said antenna, and
   adaptive array processing means provided for respective ones of said plurality of carriers, each adaptive array processing means receiving a component of a corresponding carrier from said second Fourier transform means among components for carriers of reception signals for respective ones of said antennas for extracting the component of the corresponding carrier in said desired wave,
   wherein said adaptive array processing means provides a weight vector used to extract said component of the corresponding carrier based components for corresponding carriers of at least said first and second response vectors from said first Fourier transform means.

2. The radio apparatus according to claim 1, wherein said arriving timing detection means detects said desired wave in accordance with a cross correlation between said reception signal prior to Fourier transform in said second Fourier transform means and a reference signal including a training signal component corresponding to said plurality of carriers exceeding a predetermined threshold value, for every said antenna.

3. The radio apparatus according to claim 1, wherein said reception response vector estimation means sets a response level to 0 in said first and second response vectors at a time other than said arriving timing detected by said arriving timing detection means.

4. The radio apparatus according to claim 1, wherein said adaptive array processing means provides a weight vector used to extract said desired wave for said corresponding carrier by a correlation matrix for each said carrier, provided based on components for corresponding carriers of said first and second response vectors.

5. The radio apparatus according to claim 1, wherein
   said arriving timing detection means detects an arriving timing of n (n: natural number, n≧1) interfering waves from a signal received from said array antenna,
   said reception response vector estimation means estimates third to (2n+1)th response vectors for signals arriving within said guard interval section from each head arriving wave for each of said n interfering waves, and fourth to (2n+2)th response vectors for respective signals arriving after said guard interval section from each said head arriving wave for each of said n interfering waves,
   said first Fourier transform means applies Fourier transform on said third to (2n+2)th response vectors to extract a component for each of said plurality of carriers, and
   said adaptive array processing means provides a weight vector used to extract said component of the corresponding carrier based on components for corresponding carriers of said first to (2n+2)th response vectors from said first Fourier transform means.

6. The radio apparatus according to claim 5, wherein said arriving timing detection means detects said desired wave and said interfering wave in accordance with a cross correlation between said reception signal prior to Fourier transform in said second Fourier transform means and a reference signal including training signal component corresponding to said plurality of carriers exceeding a predetermined threshold value, for every said antenna.

7. The radio apparatus according to claim 5, wherein said reception response vector estimation means sets a response level to 0 in said first to (2n+2)th response vectors at a time other than said arriving timing detected by said arriving timing detection means.

8. The radio apparatus according to claim 5, wherein said adaptive array processing means provides a weight vector used to extract said desired wave for said corresponding carrier by a correlation matrix for each said carrier, provided based on components for corresponding carriers of said first to (2n+2)th response vectors.

9. The radio apparatus according to claim 8, wherein said adaptive array processing means provides a weight vector used to extract said interfering wave for said corresponding carrier by a correlation matrix for each said carrier.

10. The radio apparatus according to claim 5, wherein said reception response vector estimation means estimates said first to (2n+2)th response vectors by an MMSE method.

11. An adaptive array processing method to extract a signal transmitted with a guard interval section added to each valid symbol section by an orthogonal frequency division communication scheme employing a plurality of carriers for every component corresponding to said plurality of carriers by an adaptive array processing, said method comprising the steps of:
    detecting an arriving timing of at least a desired wave from signals received by an array antenna including a plurality of antennas, estimating a first response vector for a signal arriving within said guard interval section from a head arriving wave out of said desired wave, and a second response vector for a signal arriving after said guard interval section from the head arriving wave out of said desired wave, applying Fourier transform on said first and second response vectors to extract components for respective ones of said plurality of carriers, providing a weight vector used to separate by adaptive array processing a component corresponding to said carrier for a desired wave, based on components for carriers of at least said first and second response vectors, applying Fourier transform on reception signals from said array antennas to extract carrier components of reception signals for respective ones of said antennas, and multiplying said weight vector by said carrier component of a reception signal for each said antenna to extract the component of said corresponding carrier for said desired wave.

12. The adaptive array processing method according to claim 11, wherein said step of detecting an arriving timing further includes the steps of detecting an arriving timing of at least one interfering wave, further comprising the steps of estimating a third response vector for a signal arriving within said guard interval section from the head arriving wave out of said interfering wave, and a fourth response vector for a signal arriving after said guard interval section from the head arriving wave out of said interfering wave, and applying Fourier transform on said third and fourth response vectors to extract components for respective ones of said plurality of carriers, wherein said step of providing a weight vector provides said weight vector based on components for carriers of said first to fourth response vectors.

* * * * *